United States Patent
Kuranuki et al.

(10) Patent No.: US 11,897,513 B2
(45) Date of Patent: Feb. 13, 2024

(54) AUTONOMOUS VEHICLE

(71) Applicant: YAMAHA HATSUDOKI KABUSHIKI KAISHA, Iwata (JP)

(72) Inventors: Yoshiki Kuranuki, Shizuoka (JP); Hokuto Fujii, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 250 days.

(21) Appl. No.: 17/239,162

(22) Filed: Apr. 23, 2021

(65) Prior Publication Data
US 2021/0237778 A1    Aug. 5, 2021

Related U.S. Application Data

(63) Continuation-in-part of application No. PCT/JP2019/041686, filed on Oct. 24, 2019.

(30) Foreign Application Priority Data

Dec. 7, 2018  (JP) ................................ 2018-230439

(51) Int. Cl.
*B60W 60/00* (2020.01)
*B60N 2/00* (2006.01)
(Continued)

(52) U.S. Cl.
CPC ....... *B60W 60/00253* (2020.02); *B60N 2/002* (2013.01); *B60W 30/182* (2013.01);
(Continued)

(58) Field of Classification Search
CPC ....... B60W 60/00253; B60W 60/0016; B60W 60/0013; B60W 30/182; B60W 30/18027;
(Continued)

(56) References Cited

U.S. PATENT DOCUMENTS

2017/0316533 A1* 11/2017 Goldman-Shenhar ...................... H04L 67/306
2018/0074495 A1*  3/2018 Myers .................. G05D 1/0066
(Continued)

FOREIGN PATENT DOCUMENTS

DE    102017001052 A1    8/2017
JP      H09153196 A     6/1997
(Continued)

OTHER PUBLICATIONS

Hou, Yunfei. Design and evaluation of Cyber Transportation Systems. State University of New York at Buffalo ProQuest Dissertations Publishing, 2016. (Year: 2016).*
(Continued)

*Primary Examiner* — James M McPherson
*Assistant Examiner* — Kyle J Kingsland
(74) *Attorney, Agent, or Firm* — Rabin & Berdo, P.C.

(57) ABSTRACT

An autonomous vehicle, including a vehicle body, a wheel supported by the vehicle body, a steering mechanism configured to change a travel direction, a driving/braking force generating device configured to generate a driving force or a braking force to drive or decelerate the autonomous vehicle, a plurality of seats each configured to be sat on by a passenger, and an autonomous driving controller configured to control the steering mechanism and the driving/braking force generating device to autonomously drive the autonomous vehicle without any driver's manipulation. The autonomous driving controller is configured to determine whether or not to control the driving/braking force generating device to change the autonomous vehicle from a stopped state to a run state, based on (1) at least one of a number of passengers, a maximum capacity, or a scheduled number of passengers, and (2) at least one of a number of
(Continued)

sitting passengers or a number of ready-state-expressing passengers.

19 Claims, 24 Drawing Sheets

(51) Int. Cl.
*B60W 30/182* (2020.01)
*G06V 20/59* (2022.01)

(52) U.S. Cl.
CPC .... *B60W 60/0013* (2020.02); *B60W 60/0016* (2020.02); *G06V 20/593* (2022.01); *B60W 2540/049* (2020.02)

(58) Field of Classification Search
CPC ..... B60W 2540/049; B60W 2540/223; B60W 2300/10; B60N 2/002; G06V 20/593; B60K 28/02
See application file for complete search history.

(56) References Cited

U.S. PATENT DOCUMENTS

| | | |
|---|---|---|
| 2018/0157271 A1 | 6/2018 | Urano et al. |
| 2018/0284793 A1 | 10/2018 | Wood et al. |
| 2019/0084447 A1* | 3/2019 | Lee ............... B60N 2/0244 |
| 2019/0103028 A1 | 4/2019 | Kobayashi et al. |
| 2019/0271552 A1* | 9/2019 | Choi ............... G01C 21/3438 |
| 2020/0043344 A1* | 2/2020 | Shimizu ............... G06Q 50/30 |

FOREIGN PATENT DOCUMENTS

| | | |
|---|---|---|
| JP | 2004227497 A | 8/2004 |
| JP | 2017126118 A | 7/2017 |
| JP | 2017182137 A | 10/2017 |
| JP | 2018090165 A | 6/2018 |
| WO | 2018037954 A1 | 3/2018 |

OTHER PUBLICATIONS

"Trans Eurasia Express 54. POD System at London Heathrow Terminal 5" written by Mikio Tanaka, [online], Aug. 2015, H.I.S. London, [searched on Jun. 28, 2018], Internet URL: https://www.his-euro.co.uk/rail-eurasia/jp/rail-eurasia54.htm.

Zhe Cao et al., "Realtime Multi-Person 2D Pose Estimation using Part Affinity Fields", Apr. 14, 2017. Referred to as "Open Pose" (Carnegie Mellon University https://arxiv.org/pdf/1611.08050.pdf) in the present disclosure.

Martin V Lowson: "Sustainable personal transportation". Integrated and Sustainable Transportation System (FISTS). 2011 IEEE Forum ON. IEEE. Jun. 29, 2011. pp. 251-257. XP032006991. DOI: 10.1109/FISTS.2011.5973634 ISBN: 978-1-4577-0990-6.

Matthias Heutger, "Self-Driving Vehicles in Logistics—A DHL perspective on implications and use cases for the logistics industry", Self-Driving Vehicles in Logistics, DHL Customer Solutions & Innovation, DE, Jan. 1, 2014, pp. 1-36, XP009527020, Retrieved from the Internet: URL:https://www.dhl.com/content/dam/downloads/gO/about_us/logistics_insights/dhl_self_driving_vehicles.pdf.

* cited by examiner

Fig.1
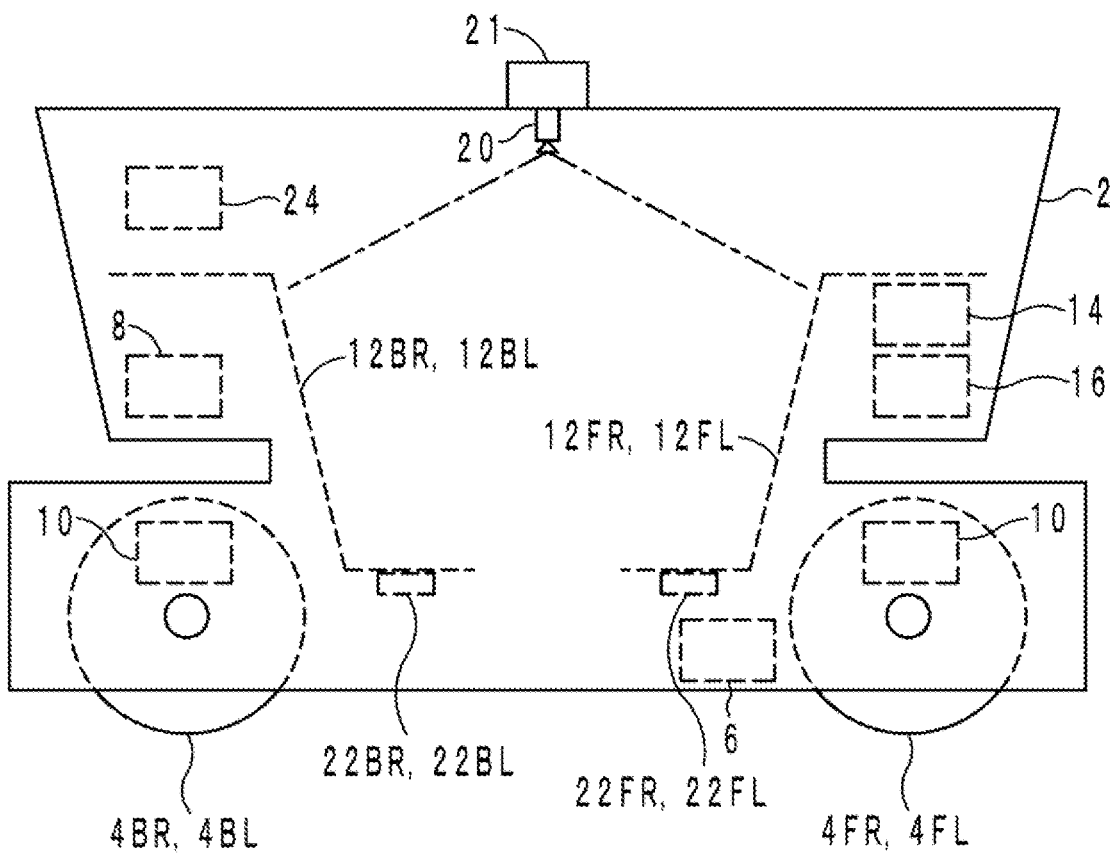
4: 4FL, 4FR, 4BL, 4BR
7: 8, 10
12: 12FL, 12FR, 12BL, 12BR
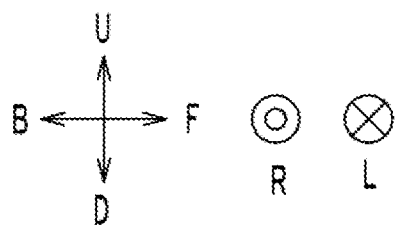

Fig.11
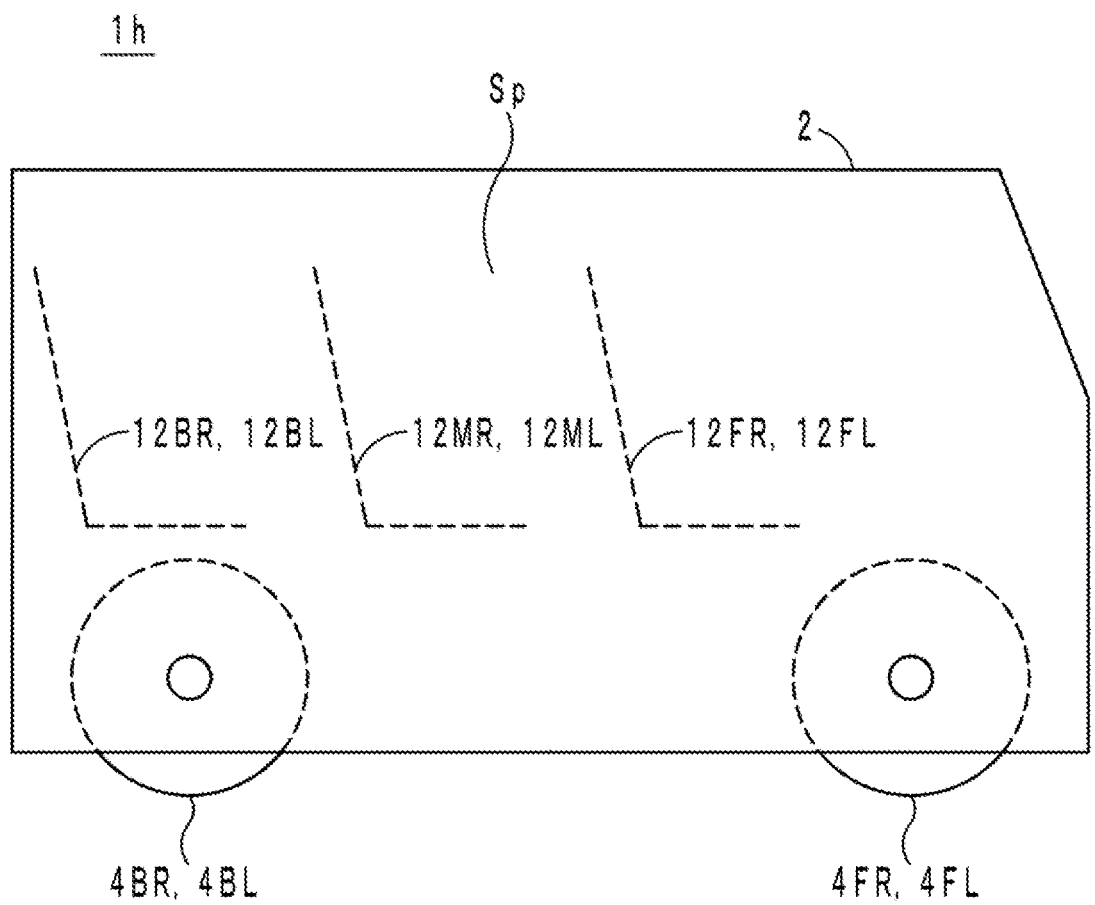
12 : 12FL, 12FR, 12ML, 12MR, 12BL, 12BR
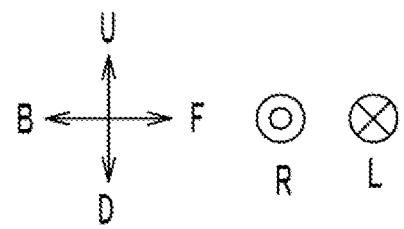

12:12FL, 12FR, 12ML, 12MR, 12BL, 12BR

12:12FL, 12FR, 12ML, 12MR, 12BL, 12BR

Fig.21
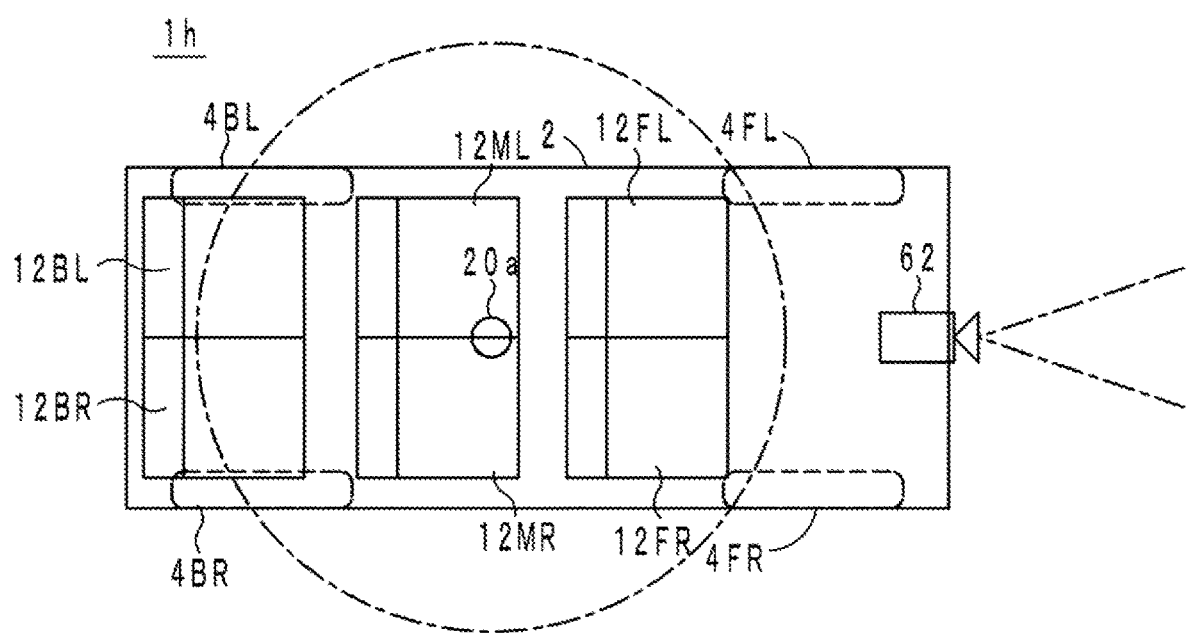
12: 12FL, 12FR, 12ML, 12MR, 12BL, 12BR
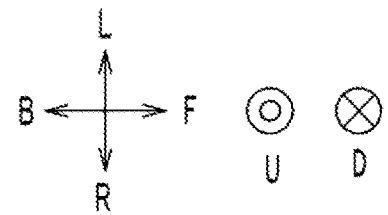

Fig.22 B
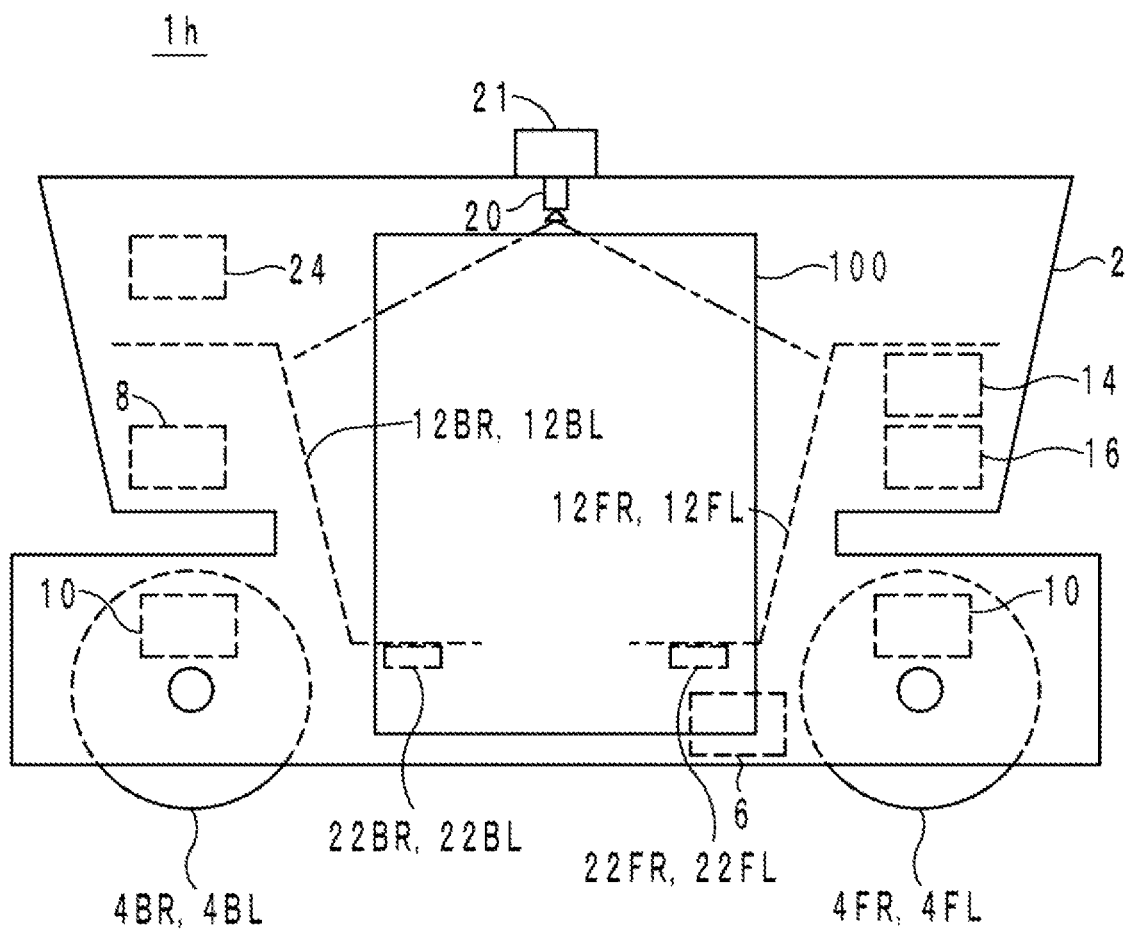
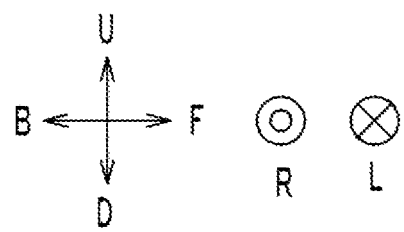

AUTONOMOUS VEHICLE

CROSS-REFERENCE TO RELATED APPLICATIONS

This is a continuation-in-part application of International Application PCT/JP2019/041686, filed on Oct. 24, 2019, which claims priority from International Application PCT/JP2018/039559, filed on Oct. 24, 2018, and a Japanese Patent Application No. 2018-230439, filed on Dec. 7, 2018. The contents of the applications are incorporated herein by reference.

TECHNICAL FIELD

The present teaching relates to an autonomous vehicle that includes a plurality of seats and can be started without any driver's manipulation.

BACKGROUND ART

An autonomous vehicle (Heathrow pod) is already known and disclosed in Non-Patent Literature 1 as a conventional autonomous vehicle. The Heathrow pod is a driverless vehicle. Accordingly, the Heathrow pod is operated autonomously. The Heathrow pod has a plurality of seats. The Heathrow pod is started when one of the passengers presses a start button.

A vehicle disclosed in Patent Literature 1 is known as another conventional autonomous vehicle. The vehicle is a driverless vehicle. Accordingly, the vehicle is operated autonomously. The vehicle determines whether or not the vehicle can be started, based on the number of passengers and the scheduled number of passengers.

CITATION LIST

Non-Patent Literature

Non-Patent Literature 1: "Trans Eurasia Express 54. POD System at London Heathrow Terminal 5" written by Mikio Tanaka, [online], August 2015, H.I.S. London, [searched on Jun. 28, 2018], Internet Patent Literature
Patent Literature: International Patent Application Publication WO 2018/037954

SUMMARY OF INVENTION

Technical Problem

In the technical field of such autonomous vehicles, an autonomous vehicle capable of starting by a new trigger is demanded.

Accordingly, an object of the present teaching is to provide an autonomous vehicle capable of starting by a new trigger.

Solution to Problem

The present inventors conducted studies to set up a new trigger for starting an autonomous vehicle including a plurality of seats. Then, the inventors found that it is sometimes desirable to change an autonomous vehicle from stopped state to run state after all the passengers individually indicate that they are ready for the change of the autonomous vehicle from stopped state to run state. In other words, the present inventors found that all the passengers' individually making an indication of being ready for a change of the autonomous vehicle from stopped state to run state should be used as a trigger to start the autonomous vehicle.

In the case of the Heathrow pod, when one of the passengers presses a start button, the Heathrow pod starts running. Thus, the Heathrow pod determines whether or not to start running by using an action taken by one of the passengers as a trigger. Therefore, the Heathrow pod is not a vehicle that changes from stopped state to run state after all the passengers individually indicate that they are ready for the change from stopped state to run state.

The vehicle disclosed in Patent Literature 1 determines whether or not to start running based on the number of passengers and the scheduled number of passengers. Thus, the vehicle disclosed in Patent Literature 1 determines whether or not to start running, not based on an action taken by any of the passengers but based on the result of comparison between two numbers that each indicate the number of persons. Therefore, the vehicle disclosed in Patent Literature 1 is not a vehicle that changes from stopped state to run state after all the passengers individually indicate that they are ready for the change from stopped state to run state.

In the circumstances, the present inventors conducted studies about any preferred configuration that permits an autonomous vehicle to change from stopped state to run state after all the passengers individually indicate that they are ready for the change of the autonomous vehicle from stopped state to run state. Then, the present inventors found that the autonomous vehicle should have a maximum capacity that is equal to the number of seats. In this case, all the passengers shall be seated. Accordingly, the autonomous vehicle can determine whether or not to change from stopped state to run state, based on (1) at least one of the number of passengers, the maximum capacity, the number of seats or the scheduled number of passengers and (2) at least one of the number of passengers sitting on seats or the number of ready-state-expressing passengers. The number of ready-state-expressing passengers means the number of passengers who are expressing that they are ready for a change of the autonomous vehicle from stopped state to run state.

More specifically, a passenger being seated indicates that said passenger has got ready for a change of the autonomous vehicle from stopped state to run state. When the number of passengers and the number of passengers sitting on seats are equal to each other, all the passengers are seated. Accordingly, for example, when the number of passengers and the number of passengers sitting on seats are equal to each other, it indicates that all the passengers are ready for a change of the autonomous vehicle from stopped state to run state.

When the maximum capacity and the number of passengers sitting on seats are equal to each other, the vehicle is filled with passengers to its maximum capacity, and all the passengers are seated. Accordingly, for example, when the maximum capacity and the number of passengers sitting on seats are equal to each other, it indicates that all the passengers are ready for a change of the autonomous vehicle from stopped state to run state.

When the number of seats and the number of passengers sitting on seats are equal to each other, the vehicle is filled with passengers to its maximum capacity, and all the passengers are seated. Accordingly, for example, when the number of seats and the number of passengers sitting on seats are equal to each other, it indicates that all the passengers are ready for a change of the autonomous vehicle from stopped state to run state.

When the scheduled number of passengers and the number of passengers sitting on seats are equal to each other, all the passengers are seated. Accordingly, for example, when the scheduled number of passengers and the number of passengers sitting on seats are equal to each other, it indicates that all the passengers are ready for a change of the autonomous vehicle from stopped state to run state.

Also, for example, when the number of passengers and the number of ready-state-expressing passengers are equal to each other, it indicates that all the passengers are ready for a change of the autonomous vehicle from stopped state to run state.

For example, when the maximum capacity and the number of ready-state-expressing passengers are equal to each other, it indicates that the vehicle is filled with passengers to its maximum capacity and that all the passengers are ready for a change of the autonomous vehicle from stopped state to run state.

For example, when the number of seats and the number of ready-state-expressing passengers are equal to each other, it indicates that the vehicle is filled with passengers to its maximum capacity and that all the passengers are ready for a change of the autonomous vehicle from stopped state to run state.

For example, when the scheduled number of passengers and the number of ready-state-expressing passengers are equal to each other, it indicates that all the passengers are ready for a change of the autonomous vehicle from stopped state to run state.

As described above, when the number of seats in an autonomous vehicle is equal to the maximum capacity of the autonomous vehicle, the autonomous vehicle can determine whether or not to change from stopped state to run state, based on (1) at least one of the number of passengers, the maximum capacity, the number of seats or the scheduled number of passengers and (2) at least one of the number of passengers sitting on seats or the number of ready-state-expressing passengers. Therefore, in order to solve the problem above, the present teaching employs the following configurations.

(1) An autonomous vehicle including:
a vehicle body;
a wheel supported by the vehicle body;
a steering mechanism supported by the vehicle body, and configured to change a direction of travel of the autonomous vehicle;
a driving/braking force generating device supported by the vehicle body, and configured to generate a driving force to drive the autonomous vehicle and a braking force to decelerate the autonomous vehicle;
a plurality of seats supported by the vehicle body, and configured to be sat on by passengers; and
an autonomous driving controller configured to control the steering mechanism and the driving/braking force generating device to autonomously drive the autonomous vehicle without any driver's manipulation,
wherein:
how many passengers are in the autonomous vehicle is defined as a number of passengers;
how many passengers are seated in the plurality of seats is defined as a number of passengers sitting on seats;
how many passengers are making a sign of being ready for a change of the autonomous vehicle from stopped state to run state is defined as a number of ready-state-expressing passengers;
how many passengers are scheduled to get in the autonomous vehicle is defined as a scheduled number of passengers;
how many seats are included in the plurality of seats is defined as a number of seats;
the number of seats is equal to a maximum capacity of the autonomous vehicle; and
the autonomous driving controller determines whether or not to control the driving/braking force generating device to change the autonomous vehicle from stopped state to run state, based on (1) at least one of the number of passengers, the maximum capacity, the number of seats or the scheduled number of passengers and (2) at least one of the number of passengers sitting on seats or the number of ready-state expressing passengers.

The autonomous vehicle of (1) can be started by a new trigger. In the autonomous vehicle of (1), the number of seats is equal to the maximum capacity of the autonomous vehicle. In this case, all the passengers shall be seated in the seats. Accordingly, the autonomous vehicle can determine whether or not to change from stopped state to run state, based on (1) at least one of the number of passengers, the maximum capacity, the number of seats or the scheduled number of passengers and (2) at least one of the number of passengers sitting on seats or the number of ready-state-expressing passengers.

More specifically, a passenger being seated indicates that said passenger has got ready for a change of the autonomous vehicle from stopped state to run state. When the number of passengers and the number of passengers sitting on seats are equal to each other, all the passengers are seated. Accordingly, when the number of passengers and the number of passengers sitting on seats are equal to each other, for example, it indicates that all the passengers are ready for a change of the autonomous vehicle from stopped state to run state.

When the maximum capacity and the number of passengers sitting on seats are equal to each other, the vehicle is filled with passengers to its maximum capacity, and all the passengers are seated. Accordingly, when the maximum capacity and the number of passengers sitting on seats are equal to each other, for example, it indicates that all the passengers are ready for a change of the autonomous vehicle from stopped state to run state.

When the number of seats and the number of passengers sitting on seats are equal to each other, the vehicle is filled with passengers to its maximum capacity, and all the passengers are seated. Accordingly, when the number of seats and the number of passengers sitting on seats are equal to each other, for example, it indicates that all the passengers are ready for a change of the autonomous vehicle from stopped state to run state.

For example, when the scheduled number of passengers and the number of ready-state-expressing passengers are equal to each other, all the passengers are seated. Accordingly, when the scheduled number of passengers and the number of ready-state-expressing passengers are equal to each other, for example, it indicates that all the passengers are ready for a change of the autonomous vehicle from stopped state to run state.

Also, for example, when the number of passengers and the number of ready-state-expressing passengers are equal to each other, it indicates that all the passengers are ready for a change of the autonomous vehicle from stopped state to run state.

For example, when the maximum capacity and the number of ready-state-expressing passengers are equal to each other, it indicates that the vehicle is filled with passengers to its maximum capacity and that all the passengers are ready for a change of the autonomous vehicle from stopped state to run state.

For example, when the number of seats and the number of ready-state-expressing passengers are equal to each other, it indicates that the vehicle is filled with passengers to its maximum capacity and that all the passengers are ready for a change of the autonomous vehicle from stopped state to run state.

For example, when the scheduled number of passengers and the number of ready-state-expressing passengers are equal to each other, it indicates that all the passengers are ready for a change of the autonomous vehicle from stopped state to run state.

As described above, when the number of seats is equal to the maximum capacity of the autonomous vehicle, the autonomous vehicle can determine whether or not to change from stopped state to run state, based on (1) at least one of the number of passengers, the maximum capacity, the number of seats or the scheduled number of passengers and (2) at least one of the number of passengers sitting on seats or the number of ready-state-expressing passengers.

(2) The autonomous vehicle according to (1), further including a non-contact-type detector configured to detect conditions inside the autonomous vehicle in a non-contacting manner and to generate non-contact detection data, wherein
the autonomous driving controller determines whether or not to control the driving/braking force generating device to change the autonomous vehicle from stopped state to run state, based on the non-contact detection data generated by the non-contact-type detector.

In the autonomous vehicle of (2), the non-contact-type detector detects conditions inside the autonomous vehicle in a non-contacting manner. Accordingly, it is not necessary to set the non-contact-type detector at a place where the passengers can touch the non-contact-type detector. Then, the flexibility in placing the non-contact-type detector is improved.

(3) The autonomous vehicle according to (2), wherein:
the non-contact-type detector is an image-capturing device configured to capture an image of an inside of the autonomous vehicle; and
the autonomous driving controller determines whether or not to control the driving/braking force generating device to change the autonomous vehicle from stopped state to run state, based on image data generated by the image-capturing device.

In the autonomous vehicle of (3), the non-contact-type detector is an image-capturing device. The image-capturing device captures an image of an inside of the autonomous vehicle. Based on the image data generated by the image-capturing device, the autonomous driving controller can obtain some kinds of information, for example, by counting the number of passengers, the number of passengers sitting on seats, and the like. Accordingly, it is not necessary to set a non-contact-type detector for each kind of information the autonomous driving controller requires. As a result, in the autonomous vehicle of (3), the required number of non-contact-type detectors can be reduced.

(4) The autonomous vehicle according to (3), wherein the image-capturing device configured to capture an image of at least one of an entrance area of the autonomous vehicle or a passenger in the autonomous vehicle.

(5) The autonomous vehicle according to any one of (2) to (4), wherein the autonomous driving controller determines whether or not to control the driving/braking force generating device to change the autonomous vehicle from stopped state to run state, based on (1) the number of passengers and (2) at least one of the number of passengers sitting on seats or the number of ready-state-expressing passengers that are recognized from the non-contact detection data generated by the non-contact-type detector.

(6) The autonomous vehicle according to (1), further including a contact-type detector configured to detect a passenger contacting an object provided in the autonomous vehicle and to generate contact detection data, wherein
the autonomous driving controller determines whether or not to control the driving/braking force generating device to change the autonomous vehicle from stopped state to run state, based on the contact detection data generated by the contact-type detector.

In the autonomous vehicle of (6), the contact-type detector detects a passenger having contact with an object provided in the autonomous vehicle. The possibility is quite high that the contact-type detector has a relatively simple structure. Accordingly, the structure of the autonomous vehicle is simple.

(7) The autonomous vehicle according to (6), wherein the autonomous driving controller determines whether or not to control the driving/braking force generating device to change the autonomous vehicle from stopped state to run state, based on (1) the number of passengers and (2) at least one of the number of passengers sitting on seats or the number of ready-state-expressing passengers that are figured out from the contact detection data generated by the contact-type detector.

(8) The autonomous vehicle according to (6) or (7), wherein:
the contact-type detector includes a plurality of ready buttons respectively provided for the seats included in the plurality of seats; and
the autonomous driving controller recognizes the number of ready-state-expressing passengers based on the contact detection data generated by the contact-type detector.

(9) The autonomous vehicle according to (1), further including:
a contact-type detector configured to detect a passenger contacting an object provided in the autonomous vehicle and to generate contact detection data; and
a non-contact-type detector configured to detect conditions inside the autonomous vehicle and to generate non-contact detection data, wherein
the autonomous driving controller determines whether or not to control the driving/braking force generating device to change the autonomous vehicle from stopped state to run state, based on the contact detection data generated by the contact-type detector and the non-contact detection data generated by the non-contact-type detector.

In the autonomous vehicle of (9), the autonomous driving controller can obtain more kinds of information from the contact detection data and the non-contact detection data. More specifically, the information obtained from contact detection data is not always completely consistent with the information obtained from non-contact detection data. There are some kinds of information that the autonomous driving controller can obtain from contact detection data but cannot obtain from non-contact detection data. Similarly, there are some kinds of information that the autonomous driving controller can obtain from non-contact detection data but cannot obtain from contact detection data. Therefore, the autonomous driving controller takes in both contact detection data and non-contact detection data, and as such, the autonomous driving controller can obtain more kinds of information from both the contact detection data and the non-contact detection data.

(10) The autonomous vehicle according to any one of (1) to (9), wherein:
a cabin space for passengers is formed in the vehicle body; and
the cabin space is designed to inhibit passengers therein from standing upright.

Being in the autonomous vehicle of (10), the passengers are encouraged to sit down in the plurality of seats. As a result, a prompt start of the autonomous vehicle becomes possible.

(11) The autonomous vehicle according to any one of (1) to (10), wherein the plurality of seats is configured to allow passengers seated therein to have face-to-face conversation with each other.

In the autonomous vehicle of (11), the passengers can see one another's faces. This impels the passengers to sit down on the plurality of seats. As a result, a prompt start of the autonomous vehicle becomes possible.

(12) The autonomous vehicle according to any one of claims (1) to (11), further including an information-providing device configured to provide information to invite passengers to sit down on the plurality of seats.

In the autonomous vehicle of (12), the passengers are invited to sit down on the plurality of seats. As a result, a prompt start of the autonomous vehicle becomes possible.

(13) The autonomous vehicle according to any one of (1) to (12), further including a door, wherein
the autonomous driving controller determines whether or not to control the driving/braking force generating device to change the autonomous vehicle from stopped state to run state, based on (1) at least one of the number of passengers, the maximum capacity, the number of seats or the scheduled number of passengers, (2) at least one of the number of passengers sitting on seats or the number of ready-state-expressing passengers, and whether the door is open or closed.

In the autonomous vehicle of (13), for example, the autonomous driving controller can change the autonomous driving vehicle to stopped state to run state after determining that the door is closed.

Some embodiments of the present teaching will hereinafter be described in detail with reference to the drawings, and the detailed description of the embodiments will provide a clearer picture of the above-mentioned object and other objects, the features, the aspects and the advantages of the present teaching.

The term "and/or" used herein includes any and all combinations of one or more of the associated listed items.

The terms "including", "comprising", or "having", and variations thereof used herein specify the presence of stated features, steps, operations, elements, components, and/or equivalents thereof, and can include one or more of steps, operations, elements, components, and/or their groups.

Unless otherwise defined, all terms (including technical and scientific terms) used herein have the same meaning as commonly understood by one of ordinary skill in the art to which the present teaching pertains.

It should be understood that terms, such as those defined in commonly used dictionaries, should be interpreted as having a meaning that is consistent with their meaning in the context of the present disclosure and relevant art and should not be interpreted in an idealized or overly formal sense unless expressly so defined herein.

It should be understood that the description of the present teaching discloses a number of techniques and steps. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purpose of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Advantageous Effects of Invention

The present teaching permits an autonomous vehicle to be started by a new trigger different from a start button.

BRIEF DESCRIPTION OF DRAWINGS

FIG. 1 is a side view of an autonomous vehicle 1.
FIG. 11 is a side view of an autonomous vehicle 1h.

FIG. 21 is a diagram showing a ninth layout example.

DESCRIPTION OF EMBODIMENTS

First Embodiment

[Overall Structure of Autonomous Vehicle]

Figure 2:
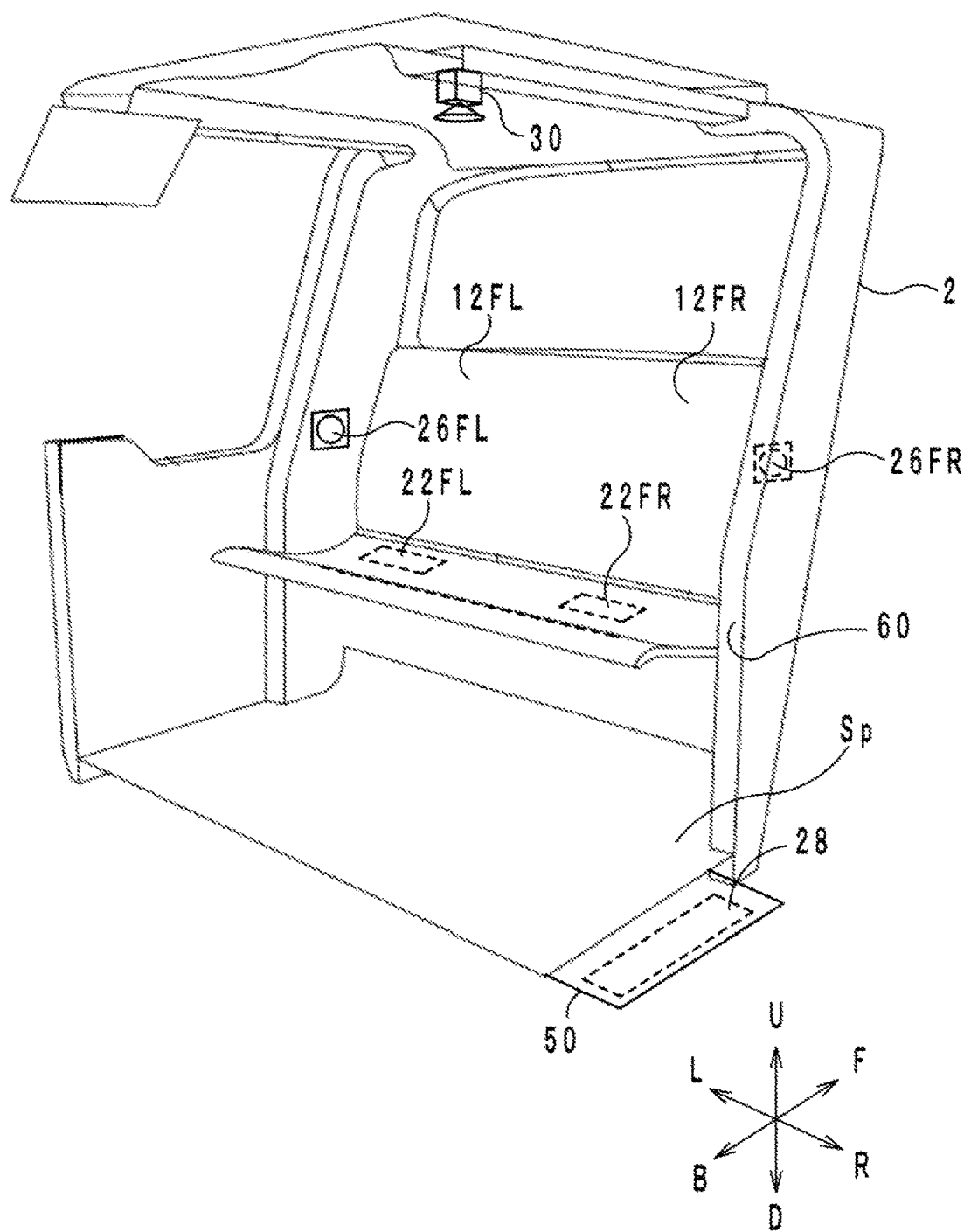
FIG. 2 is a perspective view showing the inside of the autonomous vehicle 1.

The overall structure of an autonomous vehicle according to a first embodiment of the present teaching will hereinafter be described with reference to the drawings. FIG. 1 is a side view of an autonomous vehicle 1. FIG. 1 diagrammatically shows the autonomous vehicle 1 and also shows functional blocks. FIG. 2 is a perspective view showing the inside of the autonomous vehicle 1. FIG. 2 shows a front part of the autonomous vehicle 1.

In the following paragraphs, a direction from the autonomous vehicle 1 forward is defined as a forward direction F. The forward direction F corresponds to the direction of travel of the autonomous vehicle 1. A direction from the autonomous vehicle 1 backward is defined as a backward direction B. A direction from the autonomous vehicle 1 leftward is defined as a leftward direction L. A direction from the autonomous vehicle 1 rightward is defined as a rightward direction R. A direction from the autonomous vehicle 1 upward is defined as an upward direction U. A direction from the autonomous vehicle 1 downward is defined as a downward direction D. The direction from the autonomous vehicle 1 in the forward and backward directions is defined as a forward-and-backward direction FB. The direction from the autonomous vehicle 1 in the leftward and rightward directions is defined as a leftward-and-rightward direction LR. The direction from the autonomous vehicle 1 in the upward and downward directions is defined as an upward-and-downward direction UD.

In this specification, the direction of travel of the autonomous vehicle 1 means a direction in which the autonomous vehicle 1 moves by a rotation of the wheels when normally used and excludes the direction in which the autonomous vehicle 1 moves temporarily by a reverse rotation of the wheels. If the autonomous vehicle 1 is a bi-directional vehicle, the autonomous vehicle 1 is movable in reverse by a reverse rotation of the wheels.

In this specification, a shaft or a member that extends in the forward-and-backward direction does not necessarily mean a shaft or a member that extends in parallel to the forward-and-backward direction. A shaft or a member that extends in the forward-and-backward direction includes a shaft or a member that is inclined from the forward-and-backward direction at an angle within ±45 degrees. In a similar way, a shaft or a member that extends in the upward-and-downward direction includes a shaft or a member that is inclined from the upward-and-downward direction at an angle within ±45 degrees. A shaft or a member that extends in the rightward-and-leftward direction includes a shaft or a member that is inclined from the rightward-and-leftward direction at an angle within ±45 degrees.

When two arbitrary members described in this specification are defined as a first member and a second member, the relationship between these two arbitrary members may include the following cases. In this specification, a statement that the first member is supported by the second member includes a case in which the first member is attached to the second member such that the first member is immovable (that is, fixed in a place) relative to the second member and a case in which the first member is attached to the second member such that the first member is movable relative to the second member. The statement that the first member is supported by the second member also includes a case in which the first member is directly attached to the second member and a case in which the first member is attached to the second member via a third member.

In this specification, a statement that the first member and the second member are arranged in the forward-and-backward direction means the following situation. When the first member and the second member are viewed in a direction perpendicular to the forward-and-backward direction, both the first member and the second member are on an arbitrary line representing the forward-and-backward direction. In this specification, a statement that the first member and the second member are arranged in the forward-and-backward direction when viewed in the upward or downward direction means the following situation. When the first member and the second member are viewed in the upward or downward direction, both the first member and the second member are on an arbitrary line representing the forward-and-backward direction. In this case, when the first member and the second member are viewed in the leftward or rightward direction, which is different from the upward or downward direction, not both the first member and the second member are necessarily on the arbitrary line representing the forward-and-backward direction. Further, the first member and the second member may be in contact with each other. The first member and the second member may be out of contact with each other. A third member may be positioned between the first member and the second member. Such definitions apply to other directions as well as the forward-and-backward direction.

In this specification, a statement that the first member is positioned farther in the forward direction than the second member means the following situation. At least a part of the first member is positioned in a range which the second member passes during a translation thereof in the forward direction. Accordingly, the first member may be positioned within the range which the second member passes during a translation thereof in the forward direction, or may protrude from the range which the second member passes during a translation thereof in the forward direction. In this case, the first member and the second member are arranged in the forward-and-backward direction. This definition applies to other directions as well as the forward-and-backward direction.

In this specification, the statement that the first member is in front of the second member when viewed in the leftward or rightward direction means the following situation. The first member and the second member are arranged in the forward-and-backward direction when viewed in the leftward or rightward direction. According to this definition, three-dimensionally, the first member and the second member are not necessarily arranged in the forward-and-backward direction. This definition applies to other directions as well as the forward-and-backward direction.

In this specification, the statement that the first member is in front of the second member means the following situation. The first member is positioned farther in the forward direction than a plane passing through the front edge of the second member and being perpendicular to the front-and-backward direction. In this case, the first member and the second member may be or may not be arranged in the forward-and-backward direction. This definition applies to other directions as well as the forward-and-backward direction.

In this specification, unless otherwise noted, parts of the first member are defined as follows. A front part of the first member means the front half of the first member. A rear part of the first member means the rear half of the first member. A left part of the first member means the left half of the first member. A right part of the first member means the right half of the first member. An upper part of the first member means the upper half of the first member. A lower part of the first member means the lower half of the first member. An upper edge of the first member means the edge of the first member in the upward direction. A lower edge of the first member means the edge of the first member in the downward direction. A front edge of the first member means the edge of the first member in the forward direction. A rear edge of the first member means the edge of the first member in the backward direction. A left edge of the first member means the edge of the first member in the leftward direction. A right edge of the first member means the edge of the first member in the rightward direction. An upper end part of the first member means the upper edge and its vicinity of the first member. A lower end part of the first member means the lower edge and its vicinity of the first member. A front end part of the first member means the front edge and its vicinity of the first member. A rear end part of the first member means the rear edge and its vicinity of the first member. A left end part of the first member means the left edge and its vicinity of the first member. A right end part of the first member means the right edge and its vicinity of the first member. The first member is a component of the autonomous vehicle 1.

In this specification, a statement that a structure (a member, a space or an opening) is formed between the first member and the second member means that the structure exists between the first member and the second member with respect to the direction in which the first member and the second member are arranged. The structure may or may not protrude from the first member or the second member in a direction perpendicular to the direction in which the first member and the second member are arranged.

As shown in FIG. 1, the autonomous vehicle 1 includes a vehicle body 2, a plurality of wheels 4, a steering mechanism 6, a driving/braking force generating device 7, a plurality of seats 12, an autonomous driving controller 14, an image-taking device 20, and a LIDAR (light detection and ranging) system 21.

The vehicle body 2 includes a body frame and an exterior. The vehicle body 2 is shaped like a box. Accordingly, a cabin space Sp (see FIG. 2) is formed in the vehicle body 2. The cabin space Sp is for passengers. As shown in FIG. 2, in the right surface of the vehicle body 2, an entrance 60 is formed. The entrance 60 is an opening through which passengers get in the vehicle. The passengers may get off the vehicle through the entrance 60. In the case of FIG. 2, the vehicle body 2 does not have a door which opens and closes the entrance 60. Therefore, passengers can get in the vehicle body 2 without opening a door. However, the vehicle body 2 may include a door which opens and closes the entrance 60.

The cabin space Sp of the autonomous vehicle 1 is designed to inhibit passengers therein from keeping standing. Specifically, the height from the floor to the ceiling of the vehicle body 2 is set to a height which makes it difficult for passengers to stand straight in the cabin space Sp. For example, the height is shorter than the average height of adult men. The height means a measurement in the upward-and-downward direction UD. Passengers may be inhibited from keeping standing by any other means than the height from the floor to the ceiling of the vehicle body 2. For example, the cabin space Sp may be designed so small that not all the passengers up to full capacity can get therein unless the passengers sit down in the plurality of seats 12, which will be described later.

As shown in FIG. 1, the plurality of wheels 4 are supported by the vehicle body 2. The wheels 4 are rotatable around an axle. Each of the wheels 4 includes a tire, and a wheel body holding the tire. The plurality of wheels 4 includes a left front wheel 4FL, a right front wheel 4FR, a left rear wheel 4BL, and a right rear wheel 4BR. The left front wheel 4FL is positioned in the left part and the front part of the vehicle body 2. The left front wheel 4FL is capable of turning around a left front kingpin (not shown) extending in the upward-and-downward direction UD. The right front wheel 4FR is capable of turning around a right front kingpin (not shown) extending in the upward-and-downward direction UD. Thus, the left front wheel 4FL and the right front wheel 4FR are steerable wheels. The left rear wheel 4BL is positioned in the left part and the rear part of the vehicle body 2. The right rear wheel 4BR is positioned in the right part and the rear part of the vehicle body 2.

The steering mechanism 6 is supported by the vehicle body 2. The steering mechanism 6 changes the direction of travel of the vehicle body 2. The steering mechanism 6 is a mechanism that steers at least one of the plurality of wheels 4. In the present embodiment, the steering mechanism 6 steers the left front wheel 4FL and the right front wheel 4FR in the leftward direction L or the rightward direction R. More specifically, the steering mechanism 6 turns the left front wheel 4FL around the left front kingpin and turns the right front wheel 4FR around the right front kingpin. For example, when the autonomous vehicle 1 should be controlled to turn in the leftward direction L while traveling forward, the steering mechanism 6 turns the left front wheel 4FL and the right front wheel 4FR counterclockwise when viewed in the downward direction D. For example, when the autonomous vehicle 1 should be controlled to turn in the rightward direction R while traveling forward, the steering mechanism 6 rotates the left front wheel 4FL and the right front wheel 4FR clockwise when viewed in the downward direction D. The steering mechanism 6 includes, for example, an electric motor, a speed reducer, and a rack-and-pinion steering gear mechanism. However, the steering gear mechanism need not be of a rack-and-pinion type and may be of a recirculated ball type, or the like.

The driving/braking force generating device 7 is supported by the vehicle body 2. The driving/braking force generating device 7 generates a driving force that drives the autonomous vehicle 1 and a braking force that brakes the autonomous vehicle 1. The driving/braking force generating device 7 includes a driving force generator 8 and a braking force generator 10. The driving force generator 8 generates a driving force that drives the autonomous vehicle 1. In the present embodiment, the driving force generator 8 rotates the left rear wheel 4BL and the right rear wheel 4BR. Accordingly, the left rear wheel 4BL and the right rear wheel 4BR are driving wheels. The driving force generator 8 is, for example, an engine, an electric motor, or the like. The driving force generator 8 may be a hybrid power source that uses an engine and an electric motor in combination. The braking force generator 10 generates a braking force that brakes the autonomous vehicle 1. The braking force generator 10, for example, converts the kinetic energy of the left front wheel 4FL, the right front wheel 4FR, the left rear wheel 4BL and the right rear wheel 4BR into thermal energy by friction.

The plurality of seats 12 is supported by the vehicle body 12. The plurality of seats 12 is intended to be sat on by passengers. However, seat belts are not provided on the plurality of seats 12. A seat belt is a belt for holding a passenger in the seat. Such a seat belt is, for example, a two-point seat belt, a three-point seat belt, a four-point seat belt or a six-point seat belt.

The plurality of seats 12 is a communication seat. The communication seat means a seat that permits passengers seated therein to have a face-to-face conversation with each other. The communication seat is a seat configured so that a plurality of passengers can sit on it. The communication seat, for example, includes seats that are arranged in two rows such that the passengers can sit face to face. The communication seat, for example, may include seats that are arranged in an L shape. The communication seat, for example, may include seats that are arranged in an angular C shape. The communication seat, for example, may include seats that are arranged in a square. One passenger may sit on the communication seat, or more than one passenger may sit on the communication seat. The passengers seated in the communication seat may or may not have a face-to-face conversation with each other. The communication seat may be configured to be changeable between a state in which the passengers seated therein face each other and a state in which the passengers seated therein face in the same direction. However, a seat that is fixedly set in a state in which the passengers seated therein face in the same direction is not included in the communication seat.

The plurality of seats 12 includes a left front seat 12FL, a right front seat 12FR, a left rear seat 12BL and a right rear seat 12BR. As shown in FIG. 2, the left front seat 12FL is positioned in the left part and the front part of the cabin space Sp. The left front seat 12FL is set such that a passenger seated therein will face in the backward direction B. As shown in FIG. 2, the right front seat 12FR is positioned in the right part and the front part of the cabin space Sp. Therefore, the left front seat 12FL and the right front seat 12FR are arranged side by side in the left-and-right direction LR. The right front seat 12FR is set such that a passenger seated therein will face in the backward direction B.

The left rear seat 12BL is positioned in the left part and the rear part of the cabin space Sp. Accordingly, the left rear seat 12BL is positioned farther in the backward direction B than the left front seat 12FL. The left rear seat 12BL is set such that a passenger seated therein will face in the forward direction F. Therefore, the passenger seated in the left rear seat 12BL faces the passenger seated in the left front seat 12FL and the passenger seated in the right front seat 12FR. The right rear seat 12BR is positioned in the right part and the rear part of the cabin space Sp. Therefore, the right rear seat 12BR is positioned farther in the backward direction B than the right front seat 12FR. Accordingly, the left rear seat 12BL and the right rear seat 12BR are arranged side by side in the left-and-right direction LR. The right rear seat 12BR is set such that a passenger seated therein will face in the forward direction F. Therefore, the passenger seated in the right rear seat 12BR faces the passenger seated in the left front seat 12FL and the passenger seated in the right front seat 12FR.

The number of seats included in the plurality of seats 12 is defined as the number of seats. As described above, the number of seats is 4. Meanwhile, the maximum capacity of the autonomous vehicle is 4. Thus, the number of seats is equal to the maximum capacity of the autonomous vehicle 1.

Therefore, the autonomous vehicle 1 runs with all the passengers seated in the plurality of seats 12. It is possible to find the maximum capacity of the autonomous vehicle 1 in a mark attached to the vehicle body 2 or a manual of the autonomous vehicle 1.

The image-taking device 20 is supported by the vehicle body 2. The image-taking device 20 is an example of a non-contact-type detector that is configured to detect conditions inside the autonomous vehicle 1 in a non-contacting manner and generate non-contact detection data. In the present embodiment, the image-taking device 20 is fixed in the center of the ceiling of the vehicle body 2 when viewed in the downward direction D. The image-taking device 20 faces in the downward direction D. Therefore, the image-taking device 20 takes images of the inside of the autonomous vehicle 1. In the present embodiment, the image-taking device 20 takes images of the passengers in the autonomous vehicle 1. The image-taking device 20 outputs image date as non-contact detection data to the autonomous driving controller 14, which will be described later.

The LIDAR system 21 takes in information on environment of the autonomous vehicle 1 (information about whether or not there is any obstacle). The LIDAR system 21 radiates a pulsed laser and detects scattering light generated by objects around the autonomous vehicle 1. Then, the LIDAR system 21 figures out the distance between the autonomous vehicle 1 and each of the surrounding objects from the reflection time (time from the laser radiation until the detection of reflected light).

The autonomous driving controller 14 is supported by the vehicle body 2. The autonomous driving controller 14 controls the steering mechanism 6 and the driving/braking force generating device 7 to drive the autonomous vehicle 1 autonomously without relying on any driver's manipulation. The autonomous driving controller 14 includes a memory, a CPU (central processing unit) and the like (none of them shown in the drawings). The memory stores a program for autonomous driving of the autonomous vehicle 1. The CPU carries out the program stored in the memory. Accordingly, the CPU controls the steering mechanism 6 and the driving/braking force generating device 7 to autonomously drive the autonomous vehicle 1, based on the information obtained by the image-taking device 20 and the LIDAR system 21. In this specification, autonomous driving means, for example, level 4 or 5 defined by National Highway Traffic Safety Administration of the U.S. Department of Transportation. In the autonomous vehicle 1 according to the present embodiment, especially, the autonomous driving controller 14 controls the driving/braking force generating device 7 to change the autonomous vehicle 1 from stopped state to run state, based on the non-contact detection data (image data) generated by the image-taking device 20.

[Operations of Autonomous Vehicle]

Figure 3:
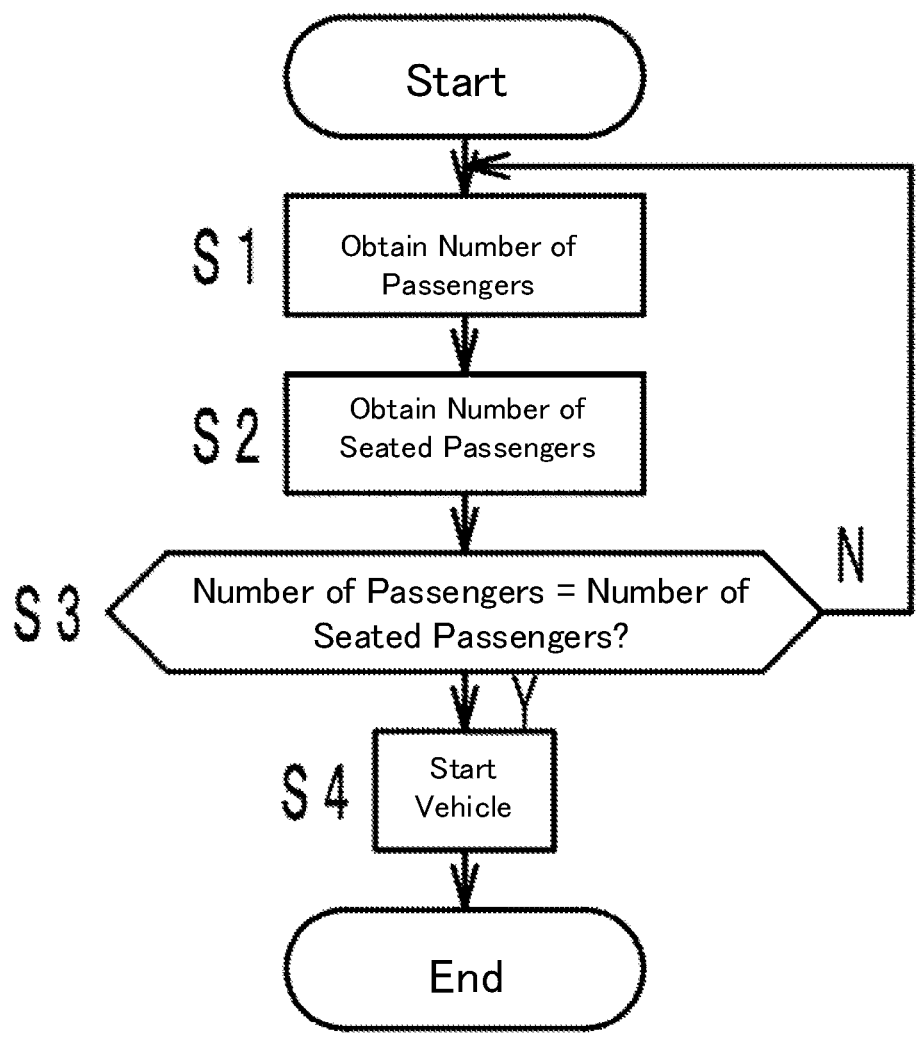
FIG. 3 is a flowchart illustrating a starting process that an autonomous driving controller 14 carries out to start a vehicle.

Next, operations of the autonomous vehicle 1 are described with reference to the drawings. Operations for a start of the autonomous vehicle 1 will hereinafter be described. The operations for a start of the autonomous vehicle 1 are operations which the autonomous vehicle 1 carries out to change from stopped state to run state. A process of operations which the autonomous vehicle 1 carries out for a start is referred to as a starting process. FIG. 3 is a flowchart showing the starting process which the autonomous vehicle 14 carries out for a start. In the following paragraphs, the number of passengers means how many passengers are in the autonomous vehicle 1. The number of seated passengers means how many passengers are seated in the plurality of seats 12.

This process is started when a passenger gets in the autonomous vehicle 1 in a stopped state. The image-taking device 20 takes images of the inside of the autonomous vehicle 1 and thereby takes images of passengers in the autonomous vehicle 1. The image-taking device 20 outputs image data to the autonomous driving controller 14 as non-contact detection data.

The autonomous driving controller 14 figures out the number of passengers based on the non-contact detection data (image data) (step S1). It is possible to count the number of passengers based on the non-contact detection data (image data) by using, for example, "OpenPose" (Carnegie Mellon University).

Next, the autonomous driving controller 14 figures out the number of seated passengers based on the non-contact detection data (image data) (step S2). By using "OpenPose", the autonomous driving controller 14 detects joints of human bodies based on the non-contact detection data (image data). Accordingly, by using "OpenPose", the autonomous driving controller 14 can detect the postures of persons based on the non-contact detection data (image data). Therefore, the autonomous driving controller 14 can determine whether each passenger is seated or not, based on the non-contact detection data (image data). In this way, the autonomous driving controller 14 can count the number of seated passengers.

Next, the autonomous driving controller 14 determines whether or not the number of passengers and the number of seated passengers are equal to each other (step S3). In other words, the autonomous driving controller 14 determines whether or not all the passengers are seated in the plurality of seats 12. At step S3, the autonomous driving controller 14 determines whether or not to control the driving/braking force generating device 7 to change the autonomous vehicle 1 from stopped state to run state, based on the number of passengers and the number of seated passengers. When the number of passengers and the number of seated passengers are equal to each other, the autonomous driving controller 14 determines that the autonomous vehicle 1 can be changed from stopped state to run state. Therefore, this process goes to step S4. When the number of passengers and the number of seated passengers are not equal to each other, the autonomous driving controller 14 determines that the autonomous vehicle 1 cannot be changed from stopped state to run state. Therefore, the process returns to step S1. In this case, the autonomous vehicle S1 is not started.

When the number of passengers and the number of seated passengers are equal to each other, the autonomous driving controller 14 controls the driving/braking force generating device 7 to change the autonomous vehicle 1 from stopped state to run state (step S4). With this operation, the starting process is completed. After this, the autonomous driving controller 14 carries out autonomous driving of the autonomous vehicle 1. The description of the autonomous driving of the autonomous vehicle 1 after the starting process is omitted.

[Effects]

(a) The autonomous vehicle 1 can be started by a new trigger different from a start button. In the autonomous vehicle 1, the number of seats is equal to the maximum capacity of the autonomous vehicle 1. In this case, all the passengers shall be seated in the plurality of seats 12. Therefore, the autonomous vehicle 1 can determine whether or not to change from stopped state to run state, based on the number of passengers and the number of seated passengers. More specifically, a passenger's being seated indicates that the passenger is ready for a change of the autonomous vehicle 1 from stopped state to run state. When the number of passengers and the number of seated passengers are equal, all the passengers are seated. Accordingly, when the number of passengers and the number of seated passengers are equal, it indicates, for example, that all the passengers are ready for a change of the autonomous vehicle 1 from stopped state to run state. Thus, the autonomous vehicle 1 can be started by a new trigger different from a start button.

(b) In the autonomous vehicle 1, the image-taking device 20 is a non-contact-type detector that detects conditions inside the autonomous vehicle 1 in a non-contacting manner. Therefore, it is not necessary to set the image-taking device 20 at a place where the passengers can touch the image-taking device 20. Then, the flexibility in placing the image-taking device 20 is improved.

(c) In the autonomous vehicle 1, the image-taking device 20 takes images of the inside of the autonomous vehicle 1. The autonomous driving controller 14 can count the number of passengers and the number of seated passengers based on the image data obtained by the image-taking device 20. Therefore, it is not necessary to use a plurality of non-contact-type detectors to count the number of passengers and to count the number of seated passengers. Thus, in the autonomous vehicle 1, the required number of non-contact-type detectors can be reduced.

(d) In the autonomous vehicle 1, the cabin space Sp is designed to inhibit passengers from keeping standing. This forces the passengers to sit down in the plurality of seats 12. As a result, the autonomous vehicle 1 can be started promptly.

(e) In the autonomous vehicle 1, the passengers can see one another's faces. This impels the passengers to sit down in the plurality of seats 12. As a result, the autonomous vehicle 1 can be started promptly.

(First Modification)

An autonomous vehicle 1a according to a first modification will hereinafter be described according to the drawings. FIG. 1 is used also as a side view of the autonomous vehicle 1a. FIG. 2 is used also as a perspective view showing the inside of the autonomous vehicle 1a.

In the autonomous vehicle 1, the autonomous driving controller 14 determines whether or not to control the driving/braking force generating device 7 to change the autonomous vehicle 1 from stopped state to run state, based on the number of passengers and the number of seated passengers. In the autonomous vehicle 1a, however, the autonomous driving controller 14 determines whether or not to control the driving/braking force generating device 7 to change the autonomous vehicle 1a from stopped state to run state, based on the number of passengers and the number of ready-state expressing passengers. The number of ready-state expressing passengers means how many passengers are individually making a ready sign which indicates that the person has got ready for a change of the autonomous vehicle 1a from stopped state to run state. In other words, the number of ready-state expressing passengers means how many passengers are individually making an indication of his/her consent to a change of the autonomous vehicle 1a from stopped state to run state. The ready sign is a motion which each passenger is supposed to make to indicate that the passenger is ready for a change of the autonomous vehicle 1a from stopped state to run state. The ready sign is giving thumbs-up, putting one's hands up, or the like.

The structure of the autonomous vehicle 1a is the same as that of the autonomous vehicle 1, and the description thereof is omitted.

[Operations of Autonomous Vehicle]

Figure 4:
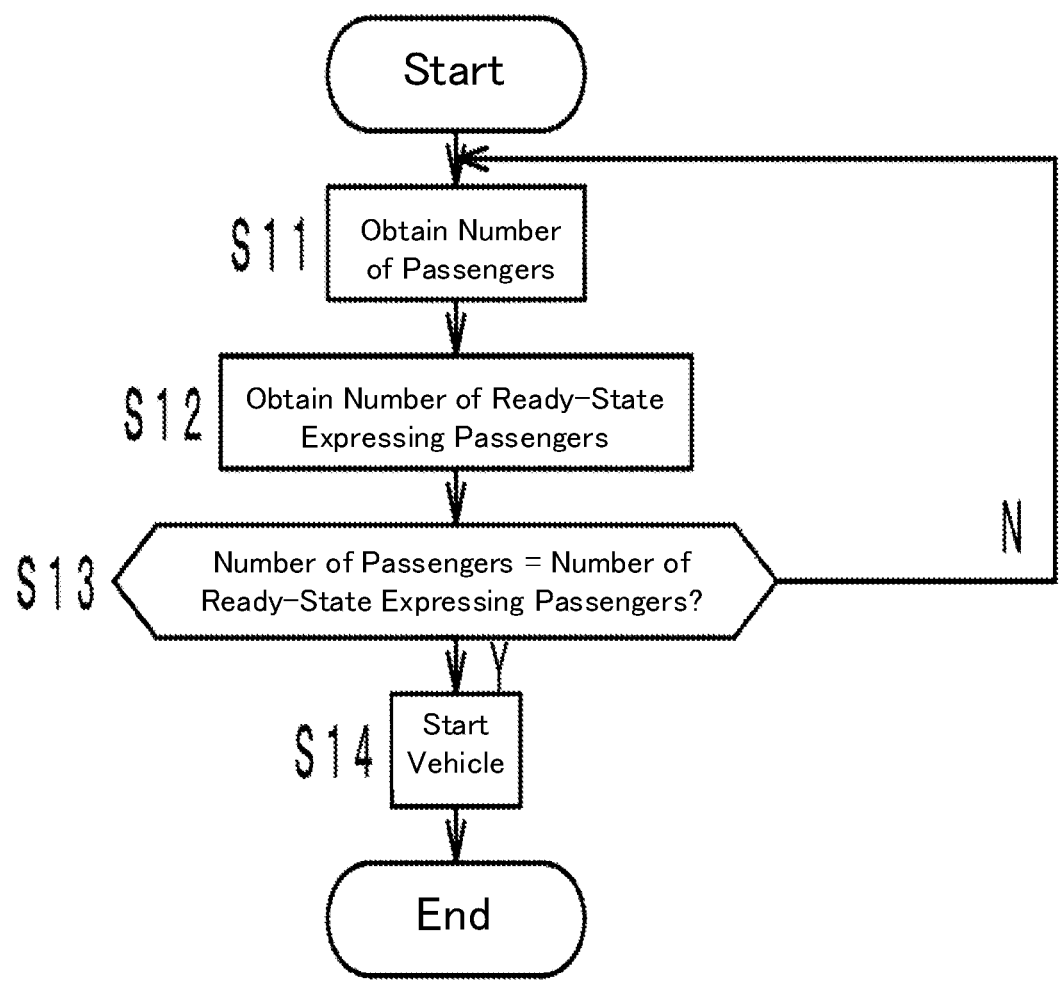
FIG. 4 is a flowchart illustrating a starting process that the autonomous driving controller 14 of an autonomous vehicle 1a carries out to start the vehicle.

Next, operations of the autonomous vehicle 1a are described with reference to the drawings. FIG. 4 is a flowchart showing a process which the autonomous driving controller 14 of the autonomous vehicle 1a carries out to start the autonomous vehicle 1a.

This process is started when a passenger gets in the autonomous vehicle 1a. The image-taking device 20 takes images of the inside of the autonomous vehicle 1a and thereby takes images of passengers in the autonomous vehicle 1a. The image-taking device 20 outputs image data to the autonomous driving controller 14 as non-contact detection data.

The autonomous driving controller 14 figures out the number of passengers based on the non-contact detection data (image data) (step S11). Step S11 in FIG. 4 is the same as step S1 in FIG. 3.

Next, the autonomous driving controller 14 figures out the number of ready-state expressing passengers based on the non-contact detection data (image data) (step S12). By using "OpenPose", the autonomous driving controller 14 detects joints of human bodies based on the non-contact detection data (image data). In other words, by using "OpenPose", the autonomous driving controller 14 can detect the postures of persons based on the non-contact detection data (image data). Therefore, the autonomous driving controller 14 can determine whether or not each passenger is making a sign that indicates his/her consent to a change from stopped state to run state, based on the non-contact detection data (image data). The sign that indicates a passenger's consent to a change of the autonomous vehicle 1a from stopped state to run state is, for example, putting his/her hands up, giving thumbs-up, or the like. In this way, the autonomous driving controller 14 can count the number of ready-state expressing passengers.

Next, the autonomous driving controller 14 determines whether or not the number of passengers and the number of ready-state expressing passengers are equal (step S13). At step S13, the autonomous driving controller 14 determines whether or not to control the driving/braking force generating device 7 to change the autonomous vehicle 1a from stopped state to run state, based on the number of passengers and the number of ready-state expressing passengers. In other words, the autonomous driving controller 14 determines whether or not all the passengers are each making a sign that indicates his/her consent to a change of the autonomous vehicle 1a from stopped state to run state. When the number of passengers and the number of ready-state expressing passengers are equal, the autonomous driving controller 14 determines that the autonomous vehicle 1a can be changed from stopped state to run state. Then, the process goes to step S14. When the number of passengers and the number of ready-state expressing passengers are not equal to each other, the autonomous driving controller 14 determines that the autonomous vehicle 1a cannot be changed from stopped state to run state. Then, the process returns to step S11. In this case, the autonomous vehicle 1a is not started.

When the number of passengers and the number of ready-state expressing passengers are equal, the autonomous driving controller 14 controls the driving/braking force generating device 7 to change the autonomous vehicle 1a from stopped state to run state (step S14). With this operation, this starting process is completed. After this, the autonomous driving controller 14 carries out autonomous driving of the autonomous vehicle 1a. The description of the autonomous driving of the autonomous vehicle 1a after the starting process is omitted.

[Effects]

(a) The autonomous vehicle 1a can be started by a new trigger different from a start button. More specifically, when the number of passengers and the number of ready-state expressing passengers are equal, it indicates that all the passengers have got ready for a change of the autonomous vehicle 1a from stopped state to run state. Therefore, the autonomous vehicle 1a can determine whether or not to change from stopped state to run state, based on the number of passengers and the number of ready-state expressing passengers. Thus, the autonomous vehicle 1a can be started by a new trigger different from a start button.

(b) In the autonomous vehicle 1a, as in the autonomous vehicle 1, the flexibility in placing the image-taking device 20 is improved.

(c) In the autonomous vehicle 1a, the image-taking device 20 takes images of the inside of the autonomous vehicle 1a. The autonomous driving controller 14 can count the number of passengers and the number of ready-state expressing passengers based on the image data obtained by the image-taking device 20. Therefore, it is not necessary to use a plurality of non-contact-type detectors to count the number of passengers and to count the number of ready-state expressing passengers. Thus, in the autonomous vehicle 1a, the required number of non-contact-type detectors can be reduced.

(d) (e) The autonomous vehicle 1a can be started promptly for the same reasons as described in connection with the autonomous vehicle 1.

(Second Modification)

An autonomous vehicle 1b according to a second modification will hereinafter be described according to the drawings. FIG. 1 is used also as a side view of the autonomous vehicle 1b. FIG. 2 is used also as a perspective view showing the inside of the autonomous vehicle 1b.

In the autonomous vehicle 1, the autonomous driving controller 14 determines whether or not to control the driving/braking force generating device 7 to change the autonomous vehicle 1 from stopped state to run state, based on the number of passengers and the number of seated passengers. In the autonomous vehicle 1b, however, the autonomous driving controller 14 determines whether or not to control the driving/braking force generating device 7 to change the autonomous vehicle 1b from stopped state to run state, based on the maximum capacity and the number of seated passengers.

The autonomous vehicle 1b is different from the autonomous vehicle 1 in that the autonomous vehicle 1b further includes a storage device 16. The storage device 16 stores data about the maximum capacity. The storage device 16 is, for example, a non-volatile memory. The structure of the autonomous vehicle 1b is the same as that of the autonomous vehicle 1, except the storage device 16, and the description thereof is omitted.

[Operations of Autonomous Vehicle]

Figure 5:
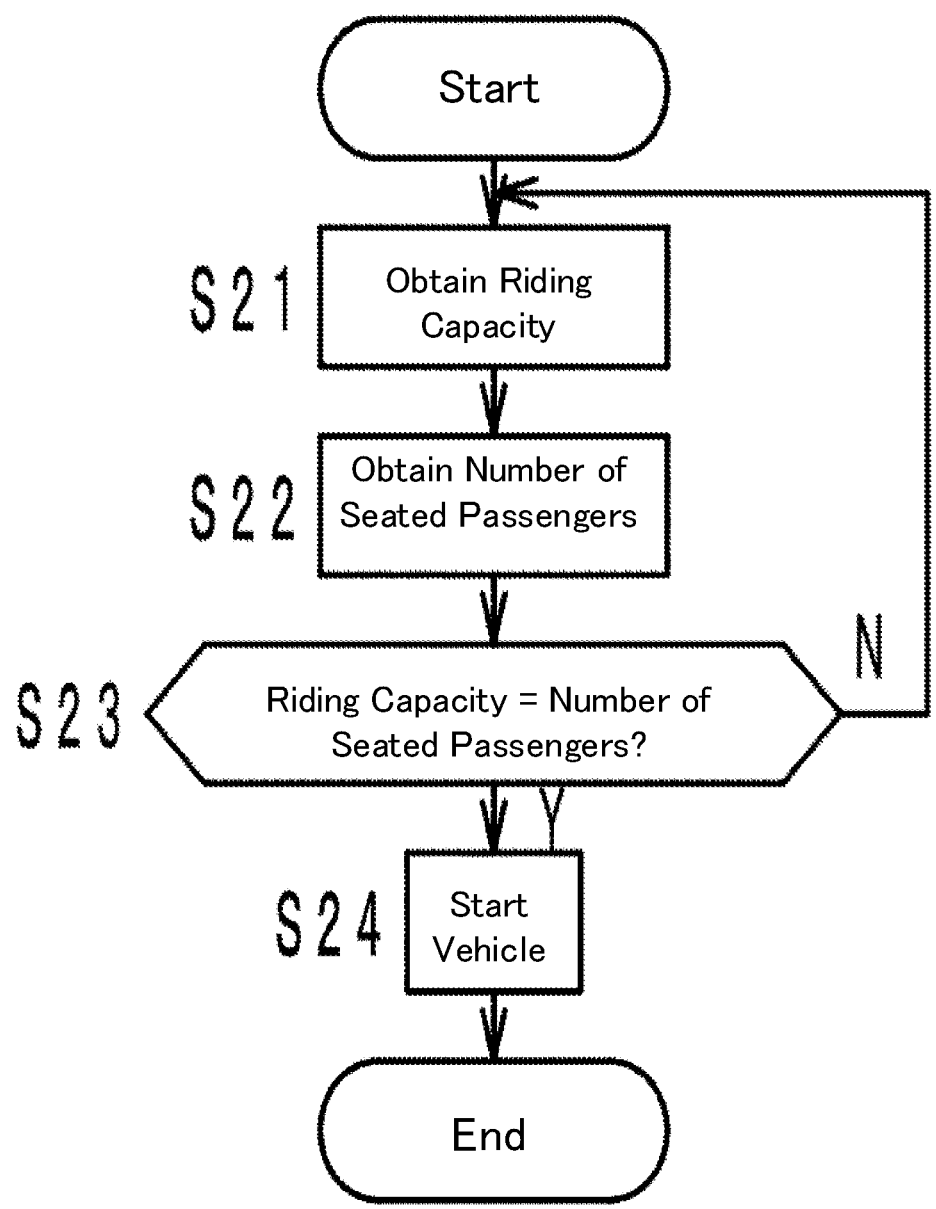
FIG. 5 is a flowchart illustrating a starting process that the autonomous driving controller 14 of an autonomous vehicle 1b carries out to start the vehicle.

Next, operations of the autonomous vehicle 1b are described with reference to the drawings. FIG. 5 is a flowchart showing a process which the autonomous driving controller 14 of the autonomous vehicle 1b carries out to start the autonomous vehicle 1b.

This process is started when a passenger gets in the autonomous vehicle 1b. The autonomous driving controller 14 reads in the data about the maximum capacity from the storage device 16 (step S21).

Next, the image-taking device 20 takes images of the inside of the autonomous vehicle 1b and thereby takes images of passengers in the autonomous vehicle 1b. The image-taking device 20 outputs image data to the autonomous driving controller 14 as non-contact detection data.

The autonomous driving controller 14 figures out the number of seated passengers based on the non-contact detection data (image data) (step S22). Step S22 in FIG. 5 is the same as step S2 in FIG. 3.

Next, the autonomous driving controller 14 determines whether or not the maximum capacity and the number of seated passengers are equal (step S23). At step 23, the autonomous driving controller 14 determines whether or not to control the driving/braking force generating device 7 to change the autonomous vehicle 1b from stopped state to run state, based on the maximum capacity and the number of seated passengers. When the maximum capacity and the number of seated passengers are equal, the autonomous driving controller 14 determines that the autonomous vehicle 1b can be changed from stopped state to run state. Then, the process goes to step S24. When the maximum capacity and the number of seated passengers are not equal to each other, the autonomous driving controller 14 determines that the autonomous vehicle 1b cannot be changed from stopped state to run state. Then, the process returns to step S21. In this case, the autonomous vehicle 1b is not started.

When the maximum capacity and the number of seated passengers are equal, the autonomous driving controller 14 controls the driving/braking force generating device 7 to change the autonomous vehicle 1b from stopped state to run state (step S24). With this operation, this starting process is completed. After this, the autonomous driving controller 14 carries out autonomous driving of the autonomous vehicle 1b. The description of the autonomous driving of the autonomous vehicle 1b after the starting process is omitted.

[Effects]

(a) The autonomous vehicle 1b can be started by a new trigger different from a start button. More specifically, in the autonomous 1b, the number of seats is equal to the maximum capacity of the autonomous vehicle 1b. In this case, all the passengers shall be seated in the plurality of seats 12. Therefore, the autonomous vehicle 1b can determine whether or not to change from stopped state to run state, based on the maximum capacity and the number of seated passengers. More specifically, a passenger's being seated indicates that the passenger is ready for a change of the autonomous vehicle 1b from stopped state to run state. When the maximum capacity and the number of seated passengers are equal, the vehicle is filled with passengers to capacity, and all the passengers are seated. Accordingly, when the maximum capacity and the number of seated passengers are equal, it indicates that all the passengers are ready for a change of the autonomous vehicle 1b from stopped state to run state. Thus, the autonomous vehicle 1b can be started by a new trigger different from a start button.

(b) In the autonomous 1b, as in the autonomous vehicle 1, the flexibility in placing the image-taking device 20 is improved.

(d) (e) The autonomous vehicle 1b can be started promptly for the same reasons as described in connection with the autonomous vehicle 1.

(Third Modification)

An autonomous vehicle 1c according to a third modification will hereinafter be described according to the drawings. FIG. 1 is used also as a side view of the autonomous vehicle 1c. FIG. 2 is used also as a perspective view showing the inside of the autonomous vehicle 1c.

In the autonomous vehicle 1, the autonomous driving controller 14 determines whether or not to control the driving/braking force generating device 7 to change the autonomous vehicle 1 from stopped state to run state, based on the number of passengers and the number of seated passengers. In the autonomous vehicle 1c, however, the autonomous driving controller 14 determines whether or not to control the driving/braking force generating device 7 to change the autonomous vehicle 1c from stopped state to run state, based on the maximum capacity and the number of ready-state expressing passengers.

The autonomous vehicle 1c is different from the autonomous vehicle 1 in that the autonomous vehicle 1c further includes a storage device 16. The storage device 16 stores data about the maximum capacity. The storage device 16 is, for example, a non-volatile memory. The structure of the autonomous vehicle 1c is the same as that of the autonomous vehicle 1, except the storage device 16, and the description thereof is omitted.

[Operations of Autonomous Vehicle]

Figure 6:
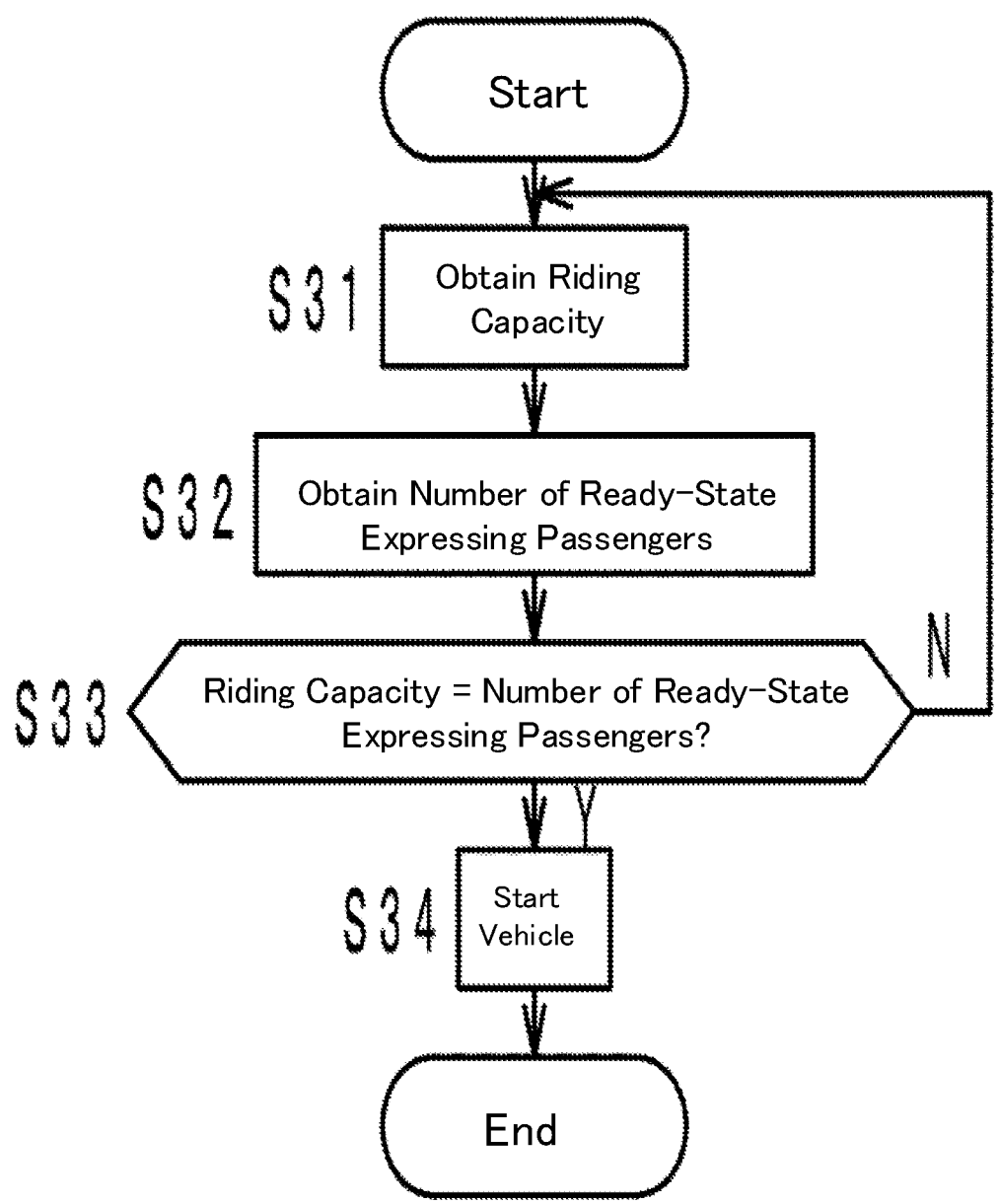
FIG. 6 is a flowchart illustrating a starting process that the autonomous driving controller 14 of an autonomous vehicle 1c carries out to start the vehicle.

Next, operations of the autonomous vehicle 1c are described with reference to the drawings. FIG. 6 is a flowchart showing a process which the autonomous driving controller 14 of the autonomous vehicle 1c carries out to start the autonomous vehicle 1c.

This process is started when a passenger gets in the autonomous vehicle 1c. The autonomous driving controller 14 reads in the data about the maximum capacity from the storage device 16 (step S31).

Next, the image-taking device 20 takes images of the inside of the autonomous vehicle 1c and thereby takes images of passengers in the autonomous vehicle 1c. The image-taking device 20 outputs image data to the autonomous driving controller 14 as non-contact detection data.

The autonomous driving controller 14 figures out the number of ready-state expressing passengers based on the non-contact detection data (image data) (step S32). Step S32 in FIG. 6 is the same as step S12 in FIG. 4.

Next, the autonomous driving controller 14 determines whether or not the maximum capacity and the number of ready-state expressing passengers are equal (step S33). At step S33, the autonomous driving controller 14 determines whether to control the driving/braking force generating device 7 to change the autonomous vehicle 1c from stopped state to run state, based on the maximum capacity and the number of ready-state expressing passengers. When the maximum capacity and the number of ready-state expressing passengers are equal, the autonomous driving controller 14 determines that the autonomous vehicle 1c can be changed from stopped state to run state. Then, the process goes to step S34. When the maximum capacity and the number of ready-state expressing passengers are not equal to each other, the autonomous driving controller 14 determines that the autonomous vehicle 1c cannot be changed from stopped state to run state. Then, the process returns to step S31. In this case, the autonomous vehicle 1c is not started.

When the maximum capacity and the number of ready-state expressing passengers are equal, the autonomous driving controller 14 controls the driving/braking force generating device 7 to change the autonomous vehicle 1c from stopped state to run state (step S34). With this operation, this starting process is completed. After this, the autonomous driving controller 14 carries out autonomous driving of the autonomous vehicle 1c. The description of the autonomous driving of the autonomous vehicle 1c after the starting process is omitted.

[Effects]

(a) The autonomous vehicle 1c can be started by a new trigger different from a start button. More specifically, when the maximum capacity and the number of ready-state expressing passengers are equal, it indicates that the vehicle is filled with passengers to capacity and that all the passengers are ready for a change of the autonomous vehicle 1c from stopped state to run state. Accordingly, the autonomous vehicle 1c can determine whether or not to change from stopped state to run state, based on the maximum capacity and the number of ready-state expressing passengers. Thus, the autonomous vehicle 1c can be started by a new trigger different from a start button.

(b) In the autonomous vehicle 1c, as in the autonomous vehicle 1, the flexibility in placing the image-taking device 20 is improved.

(d) (e) The autonomous vehicle 1c can be started promptly for the same reasons as described in connection with the autonomous vehicle 1.

(Fourth Modification)

An autonomous vehicle 1d according to a fourth modification will hereinafter be described according to the drawings. FIG. 1 is used also as a side view of the autonomous vehicle 1d. FIG. 2 is used also as a perspective view showing the inside of the autonomous vehicle 1d.

In the autonomous vehicle 1, the autonomous driving controller 14 determines whether or not to control the driving/braking force generating device 7 to change the autonomous vehicle 1 from stopped state to run state, based on the number of passengers and the number of seated passengers. In the autonomous vehicle 1d, however, the autonomous driving controller 14 determines whether or not to control the driving/braking force generating device 7 to change the autonomous vehicle 1d from stopped state to run state, based on the number of seats and the number of seated passengers.

The autonomous vehicle 1d is different from the autonomous vehicle 1 in that the autonomous vehicle 1d further includes a storage device 16. The storage device 16 stores data about the number of seats. The storage device 16 is, for example, a non-volatile memory. The structure of the autonomous vehicle 1d is the same as that of the autonomous vehicle 1, except the storage device 16, and the description thereof is omitted.

[Operations of Autonomous Vehicle]

Figure 7:
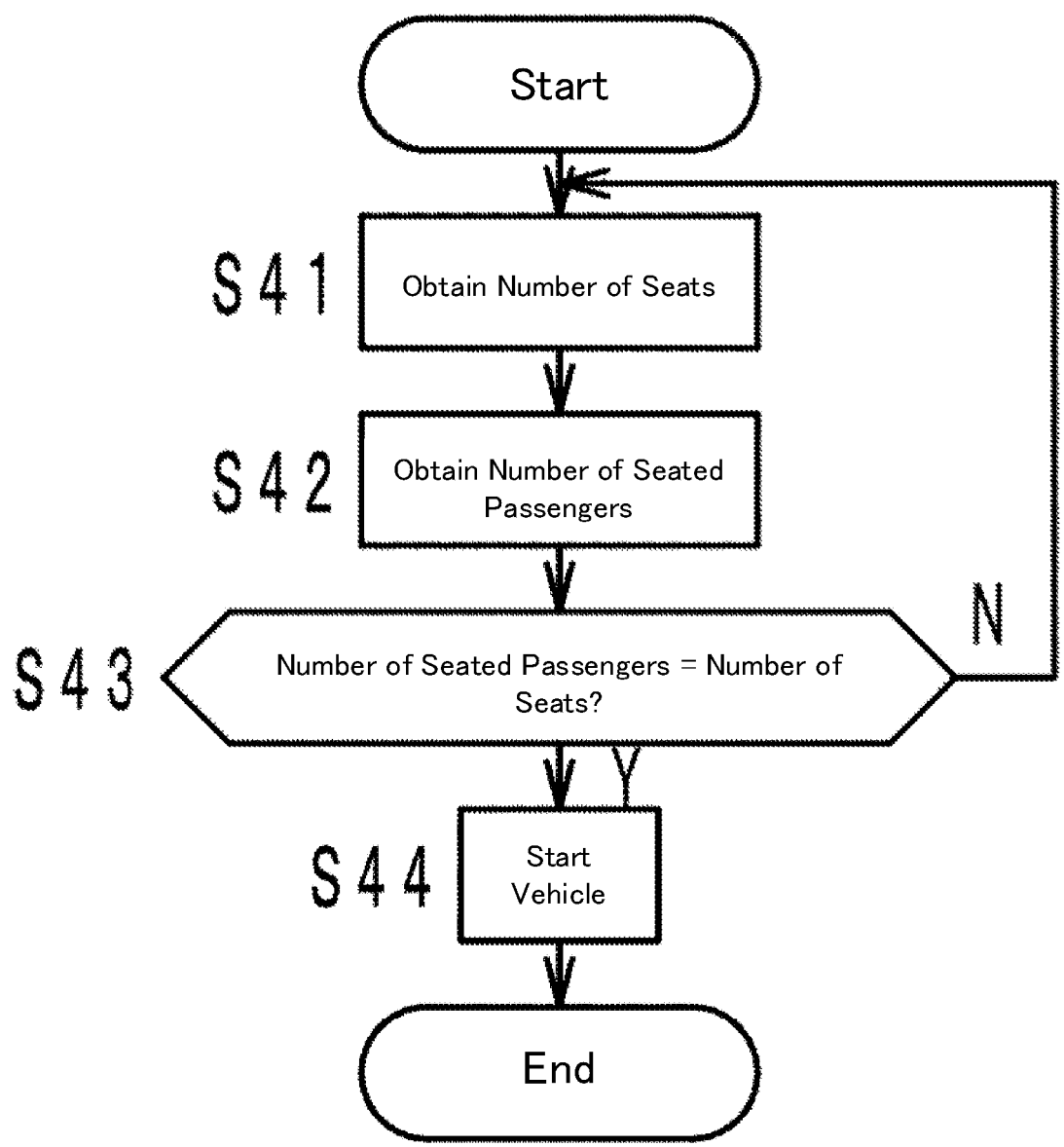
FIG. 7 is a flowchart illustrating a starting process that the autonomous driving controller 14 of an autonomous vehicle 1d carries out to start the vehicle.

Next, operations of the autonomous vehicle 1d are described with reference to the drawings. FIG. 7 is a flowchart showing a process which the autonomous driving controller 14 of the autonomous vehicle 1d carries out to start the autonomous vehicle 1d.

This process is started when a passenger gets in the autonomous vehicle 1d. The autonomous driving controller 14 reads in the data about the number of seats from the storage device 16 (step S41).

Next, the image-taking device 20 takes images of the inside of the autonomous vehicle 1d and thereby takes images of passengers in the autonomous vehicle 1d. The image-taking device 20 outputs image data to the autonomous driving controller 14 as non-contact detection data.

The autonomous driving controller 14 figures out the number of seated passengers based on the non-contact detection data (image data) (step S42). Step S42 in FIG. 7 is the same as step S2 in FIG. 3.

Next, the autonomous driving controller 14 determines whether or not the number of seats and the number of seated passengers are equal (step S43). At step S43, the autonomous driving controller 14 determines whether or not to control the driving/braking force generating device 7 to change the autonomous vehicle 1d from stopped state to run state, based on the number of seats and the number of seated passengers. At step S43, the autonomous driving controller 14 determines whether or not all the passengers are seated in the plurality of seats 12. When the number of seats and the number of seated passengers are equal, the autonomous driving controller 14 determines that the autonomous vehicle 1d can be changed from stopped state to run state. Then, this process goes to step S44. When the number of seats and the number of seated passengers are not equal to each other, the autonomous driving controller 14 determines that the autonomous vehicle 1d cannot be changed from stopped state to run state. Then, this process returns to step S41. In this case, the autonomous vehicle 1d is not started.

When the number of seats and the number of seated passengers are equal, the autonomous driving controller 14 controls the driving/braking force generating device 7 to change the autonomous vehicle 1d from stopped state to run state (step S44). With this operation, this starting process is completed. After this, the autonomous driving controller 14 carries out autonomous driving of the autonomous vehicle 1d. The description of the autonomous driving of the autonomous vehicle 1d after the starting process is omitted.

[Effects]

(a) The autonomous vehicle 1d can be started by a new trigger different from a start button. More specifically, when the number of seats and the number of seated passengers are equal, the vehicle is filled with passengers to capacity, and all the passengers are seated. Accordingly, when the number of seats and the number of seated passengers are equal, it indicates that the vehicle is filled with passengers to capacity and that all the passengers are ready for a change of the autonomous vehicle 1d from stopped state to run state. Therefore, the autonomous vehicle 1d can determine whether or not to change from stopped state to run state, based on the number of seats and the number of seated passengers. Thus, the autonomous vehicle 1d can be started by a new trigger different from a start button.

(b) In the autonomous vehicle 1d, as in the autonomous vehicle 1, the flexibility in placing the image-taking device 20 is improved.

(d) (e) The autonomous vehicle 1d can be started promptly for the same reasons as described in connection with the autonomous vehicle 1.

(Fifth Modification)

An autonomous vehicle 1e according to a fifth modification will hereinafter be described according to the drawings. FIG. 1 is used also as a side view of the autonomous vehicle 1e. FIG. 2 is used also as a perspective view showing the inside of the autonomous vehicle 1e.

In the autonomous vehicle 1, the autonomous driving controller 14
determines whether or not to control the driving/braking force generating device 7 to change the autonomous vehicle 1 from stopped state to run state, based on the number of passengers and the number of seated passengers. In the autonomous vehicle 1e, however, the autonomous driving controller 14 determines whether or not to control the driving/braking force generating device 7 to change the autonomous vehicle 1e from stopped state to run state, based on the scheduled number of passengers and the number of seated passengers. The scheduled number of passengers is the number notified in advance as the number of passengers who will get in the autonomous vehicle 1e.

The autonomous vehicle 1e is different from the autonomous vehicle 1 in that the autonomous vehicle 1e further includes a storage device 16. The storage device 16 stores data about the scheduled number of passengers. The storage device 16 is, for example, a non-volatile memory. The structure of the autonomous vehicle 1e is the same as that of the autonomous vehicle 1, except the storage device 16, and the description thereof is omitted.

It is now described how the autonomous vehicle 1e obtains data about the scheduled number of passengers. Before riding on the autonomous vehicle 1e, a person sends data about the scheduled number of passengers to a server (not shown) by using a wireless communication terminal (e.g. smartphone). The server sends the data about the scheduled number of passengers to the autonomous vehicle 1e via the internet. A receiver (not shown) of the autonomous vehicle 1e receives the data about the scheduled number of passengers, and the storage device 16 stores the data. In this way, the autonomous vehicle 1e obtains data about the scheduled number of passengers before the passengers' ride. The person may send the data about the scheduled number of passengers to the server not by using a wireless communication terminal but by using a terminal connected to a wired electric communication line. The terminal used for the data sending about the scheduled number of passengers may be a mobile terminal owned by the user or a fixed terminal fixedly set in a specified place. The autonomous vehicle 1e may figure out the scheduled number of passengers by taking in data about the scheduled number of passengers from a plurality of groups and adding up the numbers sent from the groups.

[Operations of Autonomous Vehicle]

Figure 8:
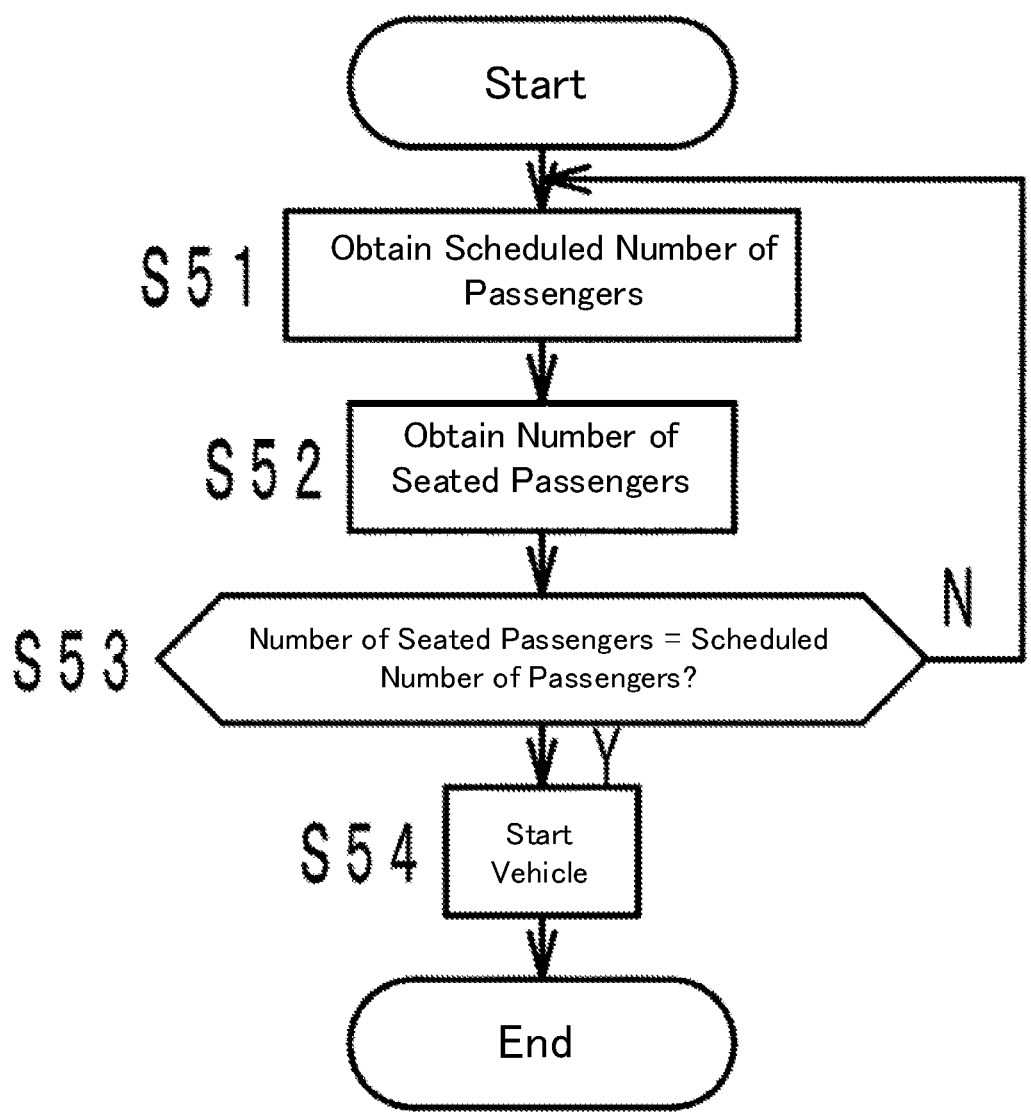
FIG. 8 is a flowchart illustrating a starting process that the autonomous driving controller 14 of an autonomous vehicle 1e carries out to start the vehicle.

Next, operations of the autonomous vehicle 1e are described with reference to the drawings. FIG. 8 is a flowchart showing a process which the autonomous driving controller 14 of the autonomous vehicle 1e carries out to start the autonomous vehicle 1e.

This process is started when a passenger gets in the autonomous vehicle 1e. The autonomous driving controller 14 reads in the data about the scheduled number of passengers from the storage device 16 (step S51).

The image-taking device 20 takes images of the inside of the autonomous vehicle 1e and thereby takes images of passengers in the autonomous vehicle 1e. The image-taking device 20 outputs image data to the autonomous driving controller 14 as non-contact detection data.

The autonomous driving controller 14 figures out the number of seated passengers based on the non-contact detection data (image data) (step S52). Step S52 in FIG. 8 is the same as step S2 in FIG. 3.

Next, the autonomous driving controller 14 determines whether or not the scheduled number of passengers and the number of seated passengers are equal (step S53). At step S53, the autonomous driving controller 14 determines whether or not to control the driving/braking force generating device 7 to change the autonomous vehicle 1e from stopped state to run state, based on the scheduled number of passengers and the number of seated passengers. At step S53, the autonomous driving controller 14 determines whether or not all the passengers who were scheduled for the ride are seated in the plurality of seats 12. When the scheduled number of passengers and the number of seated passengers are equal, the autonomous driving controller 14 determines that the autonomous vehicle 1e can be changed from stopped state to run state. Then, this process goes to step S54. When the scheduled number of passengers and the number of seated passengers are not equal to each other, the autonomous driving controller 14 determines that the autonomous vehicle 1e cannot be changed from stopped state to run state. Then, this process returns to step S51. In this case, the autonomous vehicle 1e is not started.

When the scheduled number of passengers and the number of seated passengers are equal, the autonomous driving controller 14 controls the driving/braking force generating device 7 to change the autonomous vehicle 1e from stopped state to run state (step S54). With this operation, this starting process is completed. After this, the autonomous driving controller 14 carries out autonomous driving of the autonomous vehicle 1e. The description of the autonomous driving of the autonomous vehicle 1e after the starting process is omitted.

[Effects]

(a) The autonomous vehicle 1e can be started by a new trigger different from a start button. More specifically, when the scheduled number of passengers and the number of seated passengers are equal, all the passengers are seated. Accordingly, when the scheduled number of passengers and the number of seated passengers are equal, it indicates that all the passengers are ready for a change of the autonomous vehicle from stopped state to run state. Therefore, the autonomous vehicle 1e can determine whether or not to change from stopped state to run state, based on the scheduled number of passengers and the number of seated passengers. Thus, the autonomous vehicle 1e can be started by a new trigger different from a start button.

(b) In the autonomous vehicle 1e, as in the autonomous vehicle 1, the flexibility in placing the image-taking device 20 is improved.

(d) (e) The autonomous vehicle 1e can be started promptly for the same reasons as described in connection with the autonomous vehicle 1.

(Sixth Modification)

An autonomous vehicle 1f according to a sixth modification will hereinafter be described according to the drawings. FIG. 1 is used also as a side view of the autonomous vehicle 1f. FIG. 2 is used also as a perspective view showing the inside of the autonomous vehicle 1f.

In the autonomous vehicle 1, the autonomous driving controller 14 determines whether or not to control the driving/braking force generating device 7 to change the autonomous vehicle 1 from stopped state to run state, based on the number of passengers and the number of seated passengers. In the autonomous vehicle 1f, however, the autonomous driving controller 14 determines whether or not to control the driving/braking force generating device 7 to change the autonomous vehicle 1f from stopped state to run state, based on the number of seats and the number of ready-state expressing passengers.

The autonomous vehicle 1f is different from the autonomous vehicle 1 in that the autonomous vehicle 1f further includes a storage device 16. The storage device 16 stores data about the number of seats. The storage device 16 is, for example, a non-volatile memory. The structure of the autonomous vehicle 1f is the same as that of the autonomous vehicle 1, except the storage device 16, and the description thereof is omitted.

[Operations of Autonomous Vehicle]

Figure 9:
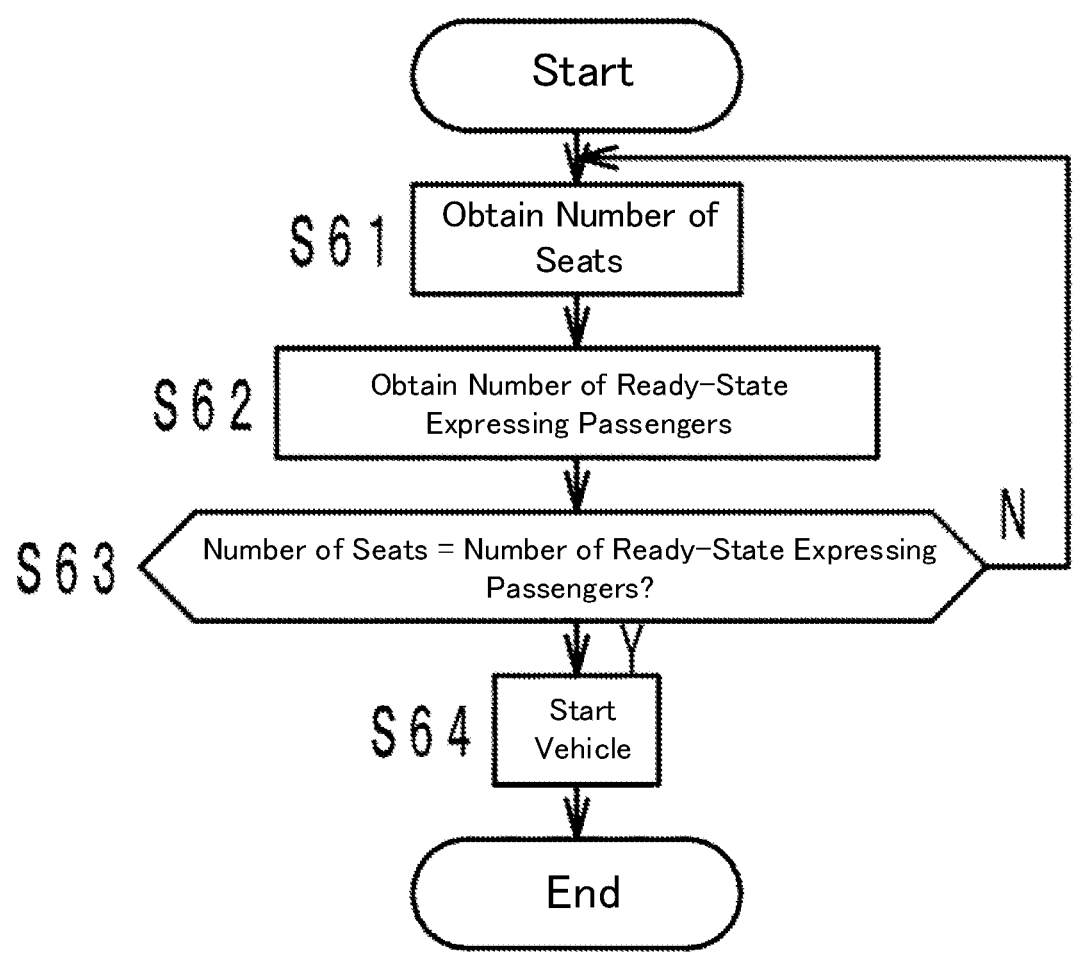
FIG. 9 is a flowchart illustrating a starting process that the autonomous driving controller 14 of an autonomous vehicle 1f carries out to start the vehicle.

Next, operations of the autonomous vehicle 1f are described with reference to the drawings. FIG. 9 is a flowchart showing a process which the autonomous driving controller 14 of the autonomous vehicle 1f carries out to start the autonomous vehicle 1f.

This process is started when a passenger gets in the autonomous vehicle 1*f*. The autonomous driving controller 14 reads in the data about the number of seats from the storage device 16 (step S61).

The image-taking device 20 takes images of the inside of the autonomous vehicle 1*f* and thereby takes images of passengers in the autonomous vehicle 1*f*. The image-taking device 20 outputs image data to the autonomous driving controller 14 as non-contact detection data.

The autonomous driving controller 14 figures out the number of ready-state expressing passengers based on the non-contact detection data (image data) (step S62). Step S62 in FIG. 9 is the same as step S12 in FIG. 4.

Next, the autonomous driving controller 14 determines whether or not the number of seats and the number of ready-state expressing passengers are equal (step S63). At step S63, the autonomous driving controller 14 determines whether or not to control the driving/braking force generating device 7 to change the autonomous vehicle 1*f* from stopped state to run state, based on the number of seats and the number of ready-state expressing passengers. The number of seats is equal to the maximum capacity of the autonomous vehicle 1*f*. At step S63, therefore, the autonomous driving controller 14 determines whether or not all the passengers are individually making an indication of his/her consent to a change of the autonomous vehicle 1*f* from stopped state to run state. When the number of seats and the number of ready-state expressing passengers are equal, the autonomous driving controller 14 determines that the autonomous vehicle 1*f* can be changed from stopped state to run state. Then, this process goes to step S64. When the number of seats and the number of ready-state expressing passengers are not equal to each other, the autonomous driving controller 14 determines that the autonomous vehicle 1*f* cannot be changed from stopped state to run state. Then, this process returns to step S61. In this case, the autonomous vehicle 1*f* is not started.

When the number of seats and the number of ready-state expressing passengers are equal, the autonomous driving controller 14 controls the driving/braking force generating device 7 to change the autonomous vehicle 1*f* from stopped state to run state (step S64). With this operation, this starting process is completed. After this, the autonomous driving controller 14 carries out autonomous driving of the autonomous vehicle 1*f*. The description of the autonomous driving of the autonomous vehicle 1*f* after the starting process is omitted.

[Effects]

(a) The autonomous vehicle 1*f* can be started by a new trigger different from a start button. More specifically, when the number of seats and the number of ready-state expressing passengers are equal, it indicates that the autonomous vehicle is filled with passengers to capacity and that all the passengers are ready for a change of the autonomous vehicle from stopped state to run state. Thus, the autonomous vehicle 1*f* can determine whether or not to change from stopped state to run state, based on the number of seats and the number of ready-state expressing passengers. In this way, the autonomous vehicle 1*f* can be started by a new trigger different from a start button.

(b) In the autonomous vehicle 1*f*, as in the autonomous vehicle 1, the flexibility in placing the image-taking device 20 is improved.

(c) The autonomous vehicle 1*f* can be started promptly for the same reasons as described in connection with the autonomous vehicle 1.

[Seventh Modification]

An autonomous vehicle 1*g* according to a seventh modification will hereinafter be described according to the drawings. FIG. 1 is used also as a side view of the autonomous vehicle 1*g*. FIG. 2 is used also as a perspective view showing the inside of the autonomous vehicle 1*g*.

In the autonomous vehicle 1, the autonomous driving controller 14 determines whether or not to control the driving/braking force generating device 7 to change the autonomous vehicle 1 from stopped state to run state, based on the number of passengers and the number of seated passengers. In the autonomous vehicle 1*g*, however, the autonomous driving controller 14 determines whether or not to control the driving/braking force generating device 7 to change the autonomous vehicle 1*g* from stopped state to run state, based on the scheduled number of passengers and the number of ready-state expressing passengers.

The autonomous vehicle 1*g* is different from the autonomous vehicle 1 in that the autonomous vehicle 1*f* further includes a storage device 16. The storage device 16 stores data about the scheduled number of passengers. The storage device 16 is, for example, a non-volatile memory. The structure of the autonomous vehicle 1*g* is the same as that of the autonomous vehicle 1, except the storage device 16, and the description thereof is omitted. The autonomous vehicle 1*g* obtains data about the scheduled number of passengers in the same way as the autonomous vehicle 1*e* does, and the description thereof is omitted.

[Operations of Autonomous Vehicle]

Figure 10:
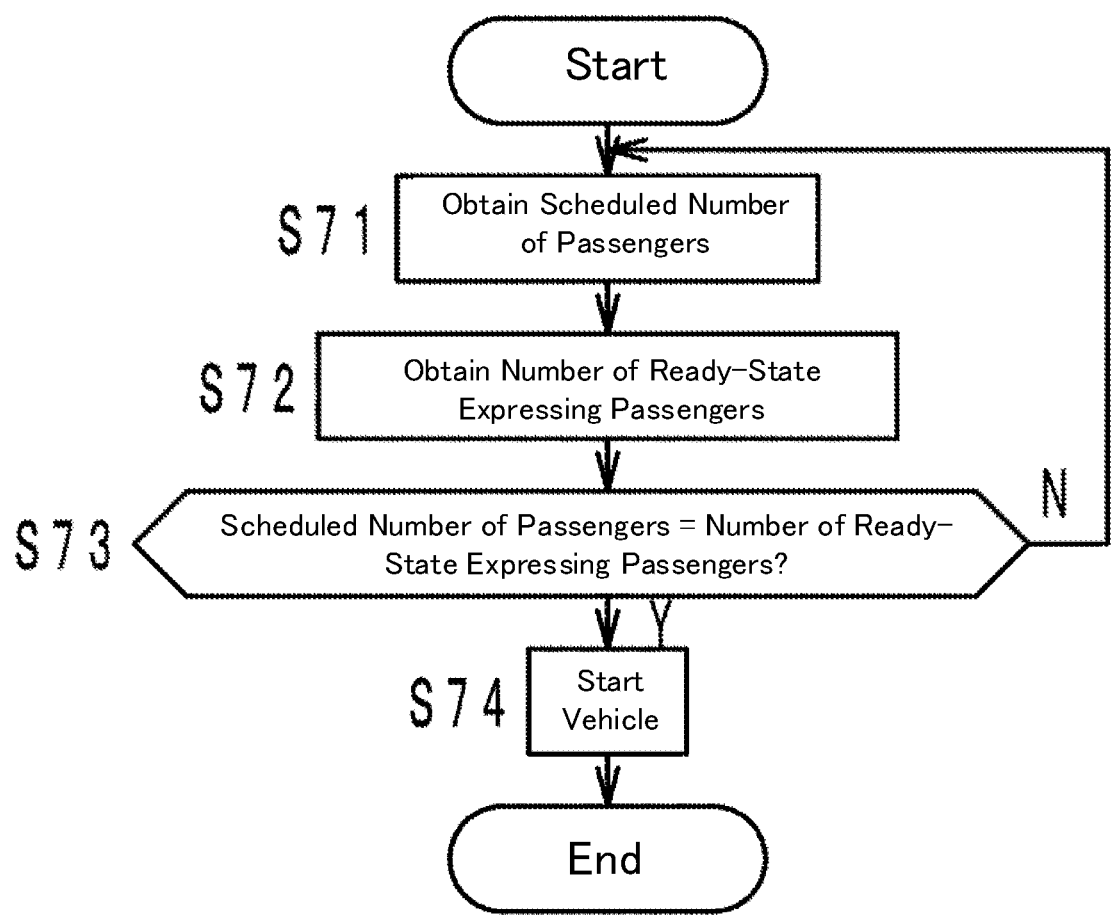
FIG. 10 is a flowchart illustrating a starting process that the autonomous driving controller 14 of an autonomous vehicle 1g carries out to start the vehicle.

Next, operations of the autonomous vehicle 1*g* are described with reference to the drawings. FIG. 10 is a flowchart showing a process which the autonomous driving controller 14 of the autonomous vehicle 1*g* carries out to start the autonomous vehicle 1*g*.

This process is started when a passenger gets in the autonomous vehicle 1*g*. The autonomous driving controller 14 reads in the data about the scheduled number of seats from the storage device 16 (step S71). Step S71 in FIG. 10 is the same as step S51 in FIG. 8.

The image-taking device 20 takes images of the inside of the autonomous vehicle 1*g* and thereby takes images of passengers in the autonomous vehicle 1*g*. The image-taking device 20 outputs image data to the autonomous driving controller 14 as non-contact detection data.

The autonomous driving controller 14 figures out the number of ready-state expressing passengers based on the non-contact detection data (image data) (step S72). Step S72 in FIG. 10 is the same as step S12 in FIG. 4.

Next, the autonomous driving controller 14 determines whether or not the scheduled number of passengers and the number of ready-state expressing passengers are equal (step S73). At step S73, the autonomous driving controller 14 determines whether or not to control the driving/braking force generating device 7 to change the autonomous vehicle 1 from stopped state to run state, based on the scheduled number of passengers and the number of ready-state expressing passengers. At step S73, the autonomous driving controller 14 determines whether or not all the passengers are individually making an indication of his/her consent to a change of the autonomous vehicle 1*g* from stopped state to run state. When the scheduled number of passengers and the number of ready-state expressing passengers are equal, the autonomous driving controller 14 determines that the autonomous vehicle 1*g* can be changed from stopped state to run state. Then, this process goes to step S74. When the scheduled number of passengers and the number of ready-state expressing passengers are not equal to each other, the autonomous driving controller 14 determines that the autonomous vehicle 1g cannot be changed from stopped state to run state. Then, this process returns to step S71. In this case, the autonomous vehicle 1g is not started.

When the scheduled number of passengers and the number of ready-state expressing passengers are equal, the autonomous driving controller 14 controls the driving/braking force generating device 7 to change the autonomous vehicle 1g from stopped state to run state (step S74). With this operation, this starting process is completed. After this, the autonomous driving controller 14 carries out autonomous driving of the autonomous vehicle 1g. The description of the autonomous driving of the autonomous vehicle 1g after the starting process is omitted.

[Effects]

(a) The autonomous vehicle 1g can be started by a new trigger different from a start button. More specifically, when the scheduled number of passengers and the number of ready-state expressing passengers are equal, it indicates that all the passengers are ready for a change of the autonomous vehicle 1g from stopped state to run state. Then, the autonomous vehicle 1g can determine whether or not to change from stopped state to run state, based on the scheduled number of passengers and the number of ready-state expressing passengers. Thus, the autonomous vehicle 1g can be started by a new trigger different from a start button.

(b) In the autonomous vehicle 1g, as in the autonomous vehicle 1, the flexibility in placing the image-taking device 20 is improved.

(c) The autonomous vehicle 1g can be started promptly for the same reasons as described in connection with the autonomous vehicle 1.

Eighth Embodiment

Figure 12:
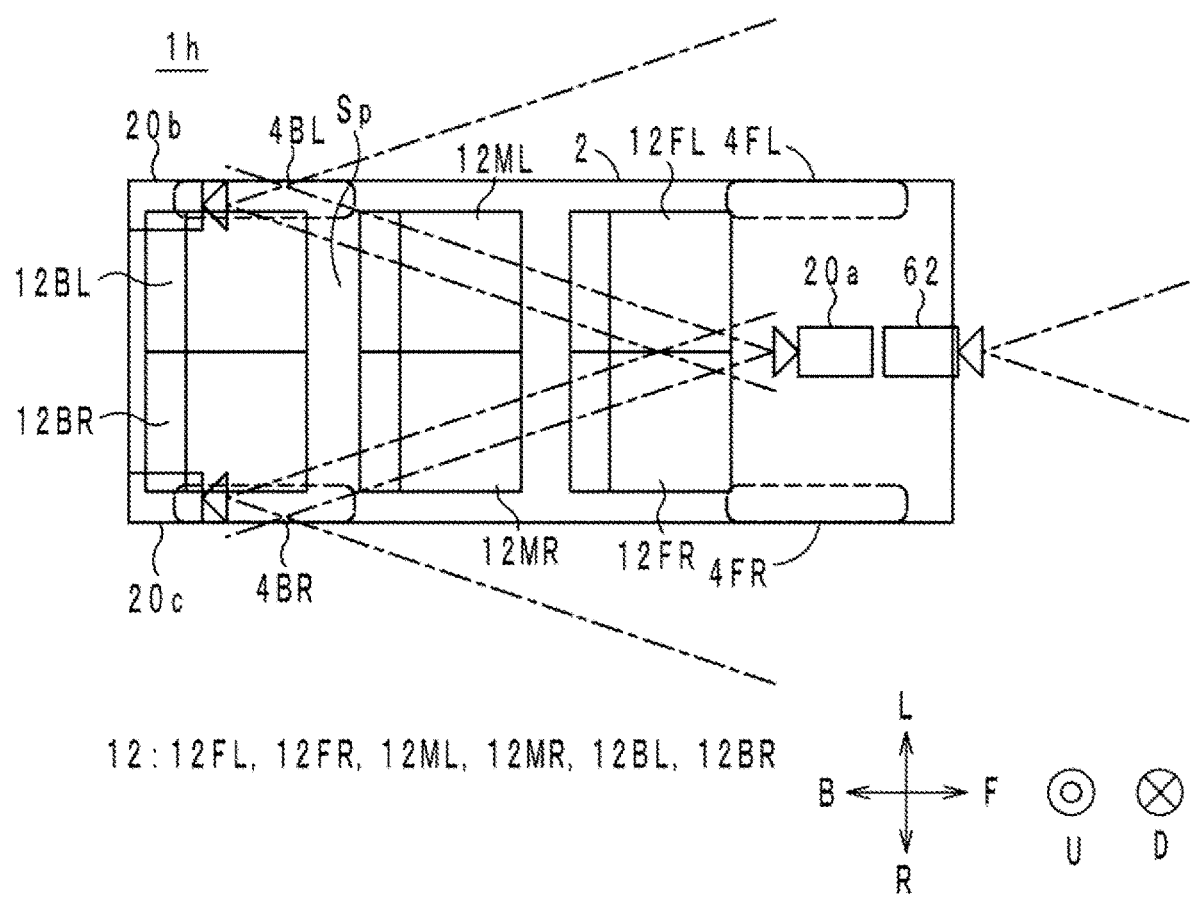
FIG. 12 is a top view of the autonomous vehicle 1h.

An autonomous vehicle 1h according to an eighth modification will hereinafter be described according to the drawings. FIG. 11 is a side view of the autonomous vehicle 1h. FIG. 12 is a top view of the autonomous vehicle 1h. In FIGS. 11 and 12, the autonomous driving vehicle 1h is schematically shown.

The autonomous vehicle 1h is different from the autonomous vehicle 1 in the following two points.

Point 1

The autonomous vehicle 1h is different from the autonomous vehicle 1 in the layout of the plurality of seats 12. Specifically, the plurality of seats 12 of the autonomous vehicle 1 is a communication seat. On the other hand, the plurality of seats 12 of the autonomous vehicle 1h is not a communication seat.

Point 2

The layout of image-taking devices 20a, 20b, 20c and 62 in the autonomous vehicle 1h is different from the layout of the image-taking device in the autonomous vehicle 1. Specifically, the autonomous vehicle 1 has one image-taking device 20. However, the autonomous vehicle 1h has four image-taking devices 20a, 20b, 20c and 62.

The autonomous vehicle 1h will hereinafter be described focusing on the differences above. As shown in FIG. 11, the autonomous vehicle 1h includes a plurality of seats 12. The plurality of seats 12 includes a left front seat 12FL, a right front seat 12FR, a left middle seat 12ML, a right middle seat 12MR, a left rear seat 12BL and a right rear seat 12BR.

The left front seat 12FL, the left middle seat 12ML and the left rear seat 12BL are, as shown in FIG. 12, located in the left part of the cabin space Sp. The left front seat 12FL, the left middle seat 12ML and the left rear seat 12BL are arranged in a line in this order in the backward direction B from the forward direction F. The left front seat 12FL, the left middle seat 12ML and the left rear seat 12BL are set such that passengers in the respective seats 12FL, 12ML and 12BL will face in the forward direction F.

The right front seat 12FR, the right middle seat 12MR and the right rear seat 12BR are, as shown in FIG. 12, located in the right part of the cabin space Sp. The right front seat 12FR, the right middle seat 12MR and the right rear seat 12BR are arranged in a line in this order in the backward direction B from the forward direction F. Accordingly, the right front seat 12FR is positioned farther in the rightward direction R than the left front seat 12FL. The right middle seat 12MR is positioned farther in the rightward direction R than the left middle seat 12ML. The right rear seat 12BL is positioned farther in the rightward direction R than the left rear seat 12BL. The right front seat 12FR, the right middle seat 12MR and the right rear seat 12BR are set such that passengers in the respective seats 12FR, 12MR and 12BR will face in the forward direction F.

The image-taking device 62 is positioned in the front end part of the vehicle body 2. The image-taking device 62 takes images of the space farther in the forward direction F than the autonomous vehicle 1h. The image-taking device 62 outputs image data to the autonomous driving controller 14 (not shown in either FIG. 11 or FIG. 12). Based on the image data output from the image-taking device 62, the autonomous driving controller 14 controls the steering mechanism 6 (not shown in either FIG. 11 or FIG. 12) and the driving/braking force generating device 7 (not shown in either FIG. 11 or FIG. 12) to autonomously drive the autonomous vehicle 1.

The image-taking device 20a is positioned in the center of the vehicle body 2 with respect to the left-and-right direction LR of the vehicle body 2 and farther in the forward direction F than the left front seat 12FL and the right front seat 12FR. The image-taking device 20a faces in the backward direction B. Accordingly, the image-taking device 20a takes images of the left middle seat 12ML, the right middle seat 12MR, the left rear seat 12BL and the right rear seat 12BR.

The image-taking device 20b is positioned in the rear end part and the left end part of the vehicle body 2. The image-taking device 20b faces in the forward direction F. Accordingly, the image-taking device 20b takes images of the left front seat 12FL and the left middle seat 12ML. Also, the image-taking device 20b takes images of the space farther in the leftward direction L than the vehicle body 2. Accordingly, the autonomous driving controller 14 can notice a passenger sticking out some part of his/her body (for example, an arm) or an obstacle existing in a place farther in the leftward direction L than the vehicle body 2.

The image-taking device 20c is positioned in the rear end part and the right end part of the vehicle body 2. The image-taking device 20c faces in the forward direction F. Accordingly, the image-taking device 20c takes images of the right front seat 12FR and the right middle seat 12MR. Also, the image-taking device 20c takes images of the space farther in the rightward direction R than the vehicle body 2. Accordingly, the autonomous driving controller 14 can notice a passenger sticking out some part of his/her body (for example, an arm) or an obstacle existing in a place farther in the rightward direction R than the vehicle body 2.

In the autonomous vehicle 1h, as described above, the image-taking devices 20a, 20b and 20c complement one another's shooting ranges to take images of the entire cabin space Sp. The structure of the other part of the autonomous vehicle 1h is the same as that of the autonomous vehicle 1, and the description thereof is omitted.

Figure 13:
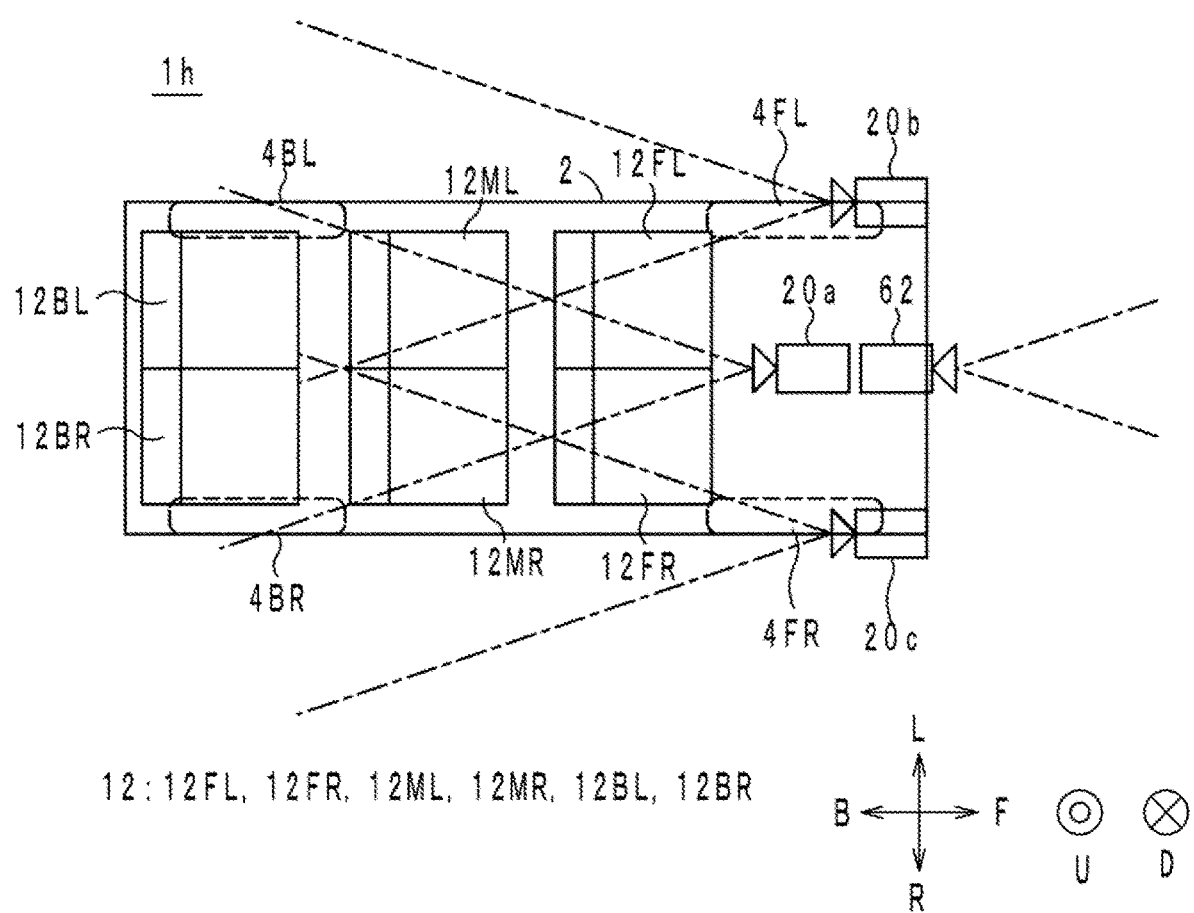
FIG. 13 is a diagram showing a first layout example.
Figure 14:
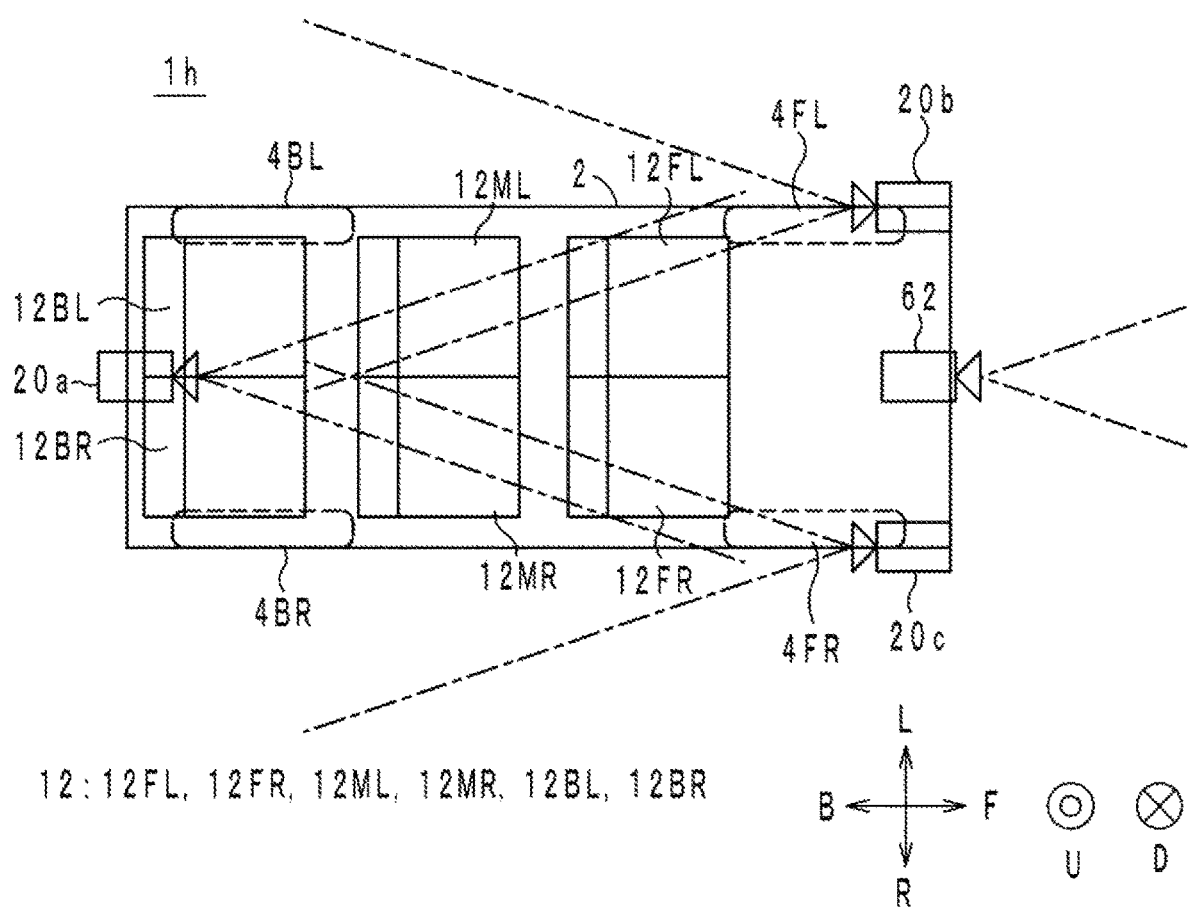
FIG. 14 is a diagram showing a second layout example.
Figure 16:
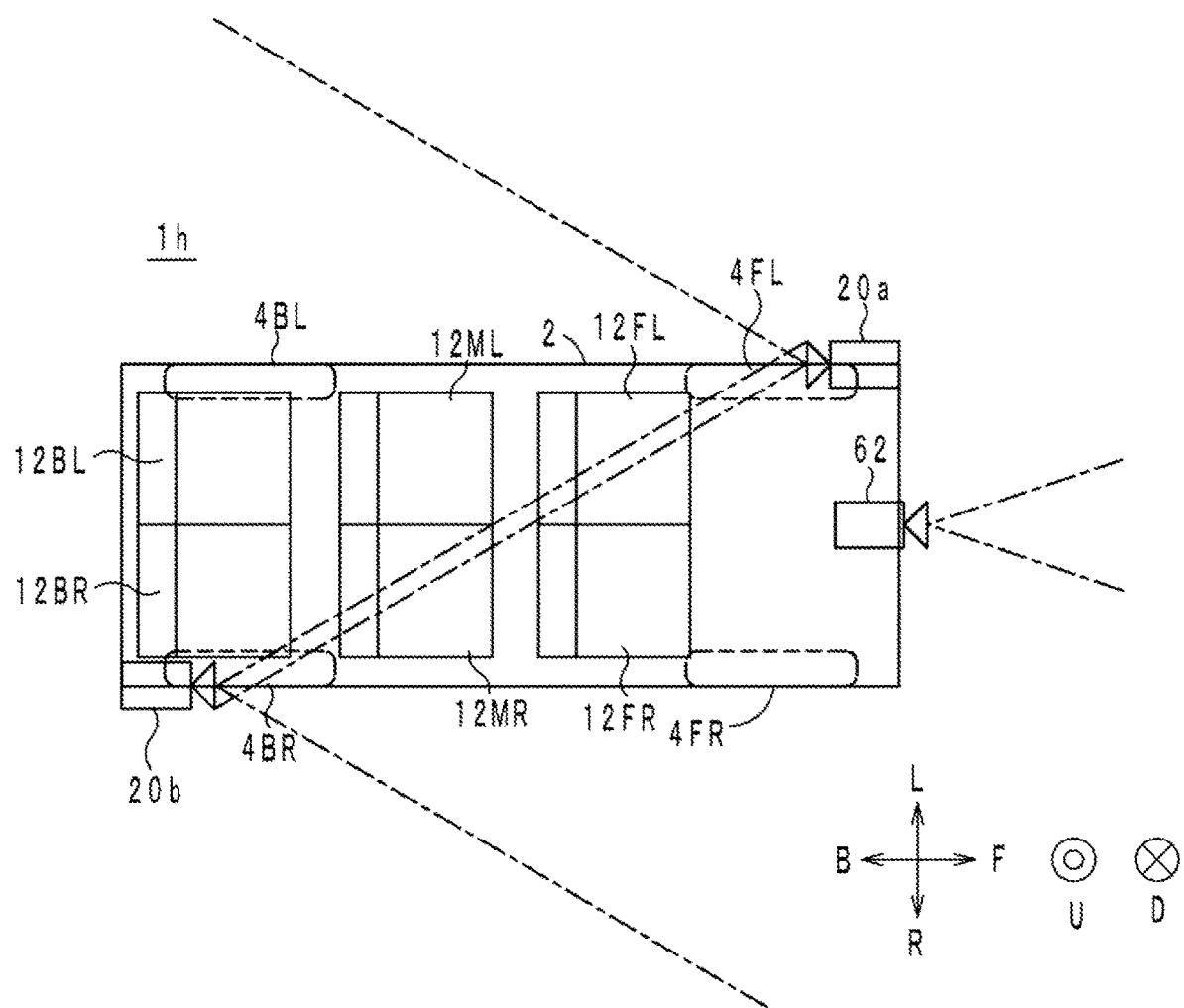
FIG. 16 is a diagram showing a fourth layout example.
Figure 17:
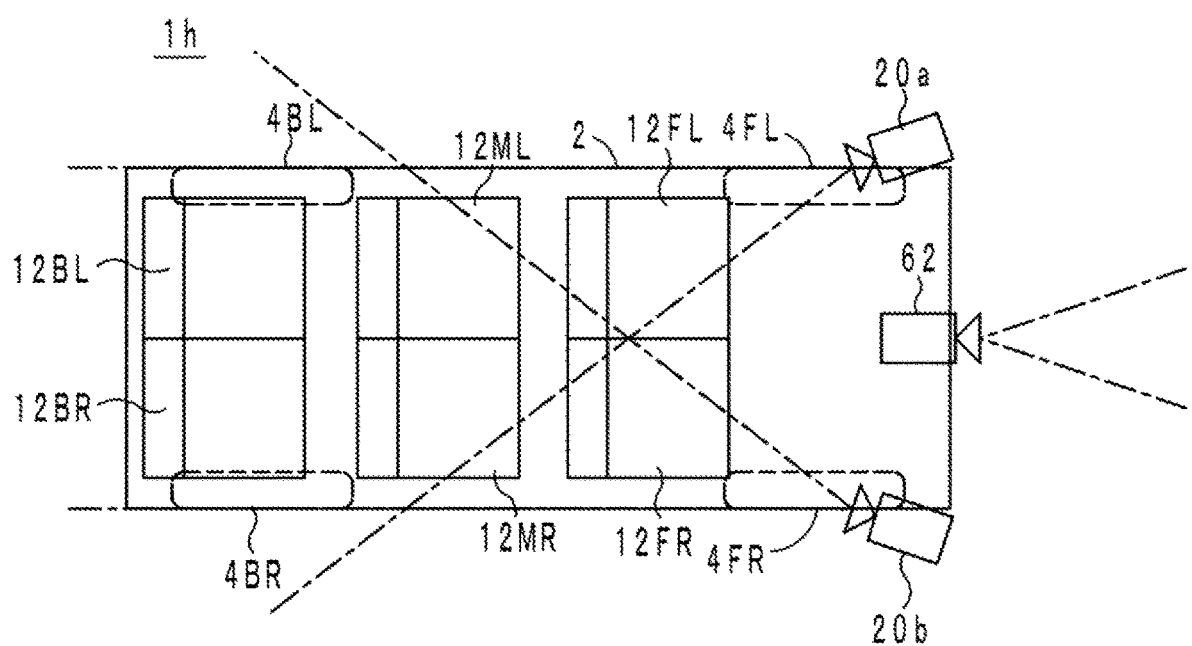
FIG. 17 is a diagram showing a fifth layout example.
Figure 18:
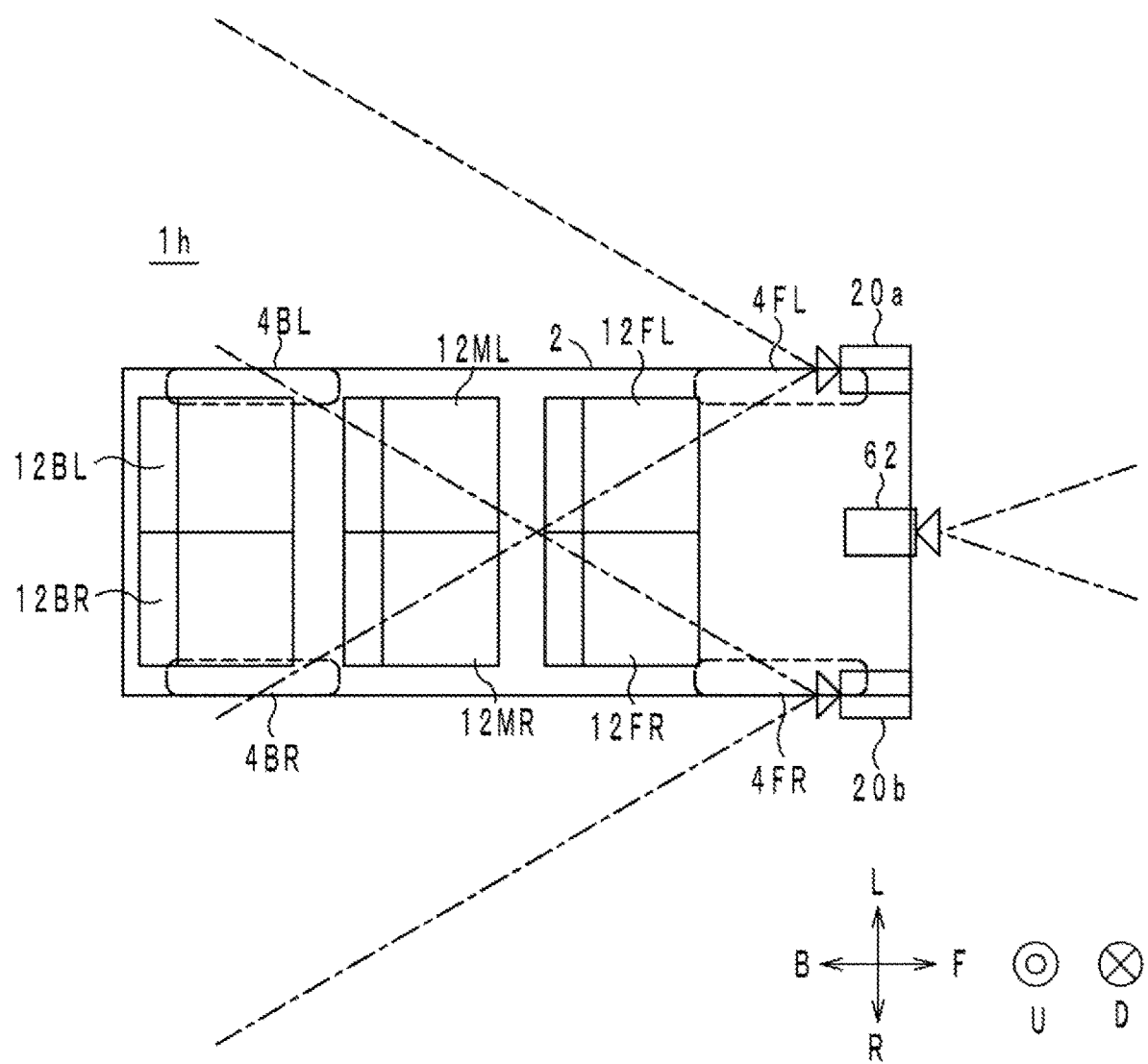
FIG. 18 is a diagram showing a sixth layout example.
Figure 19:
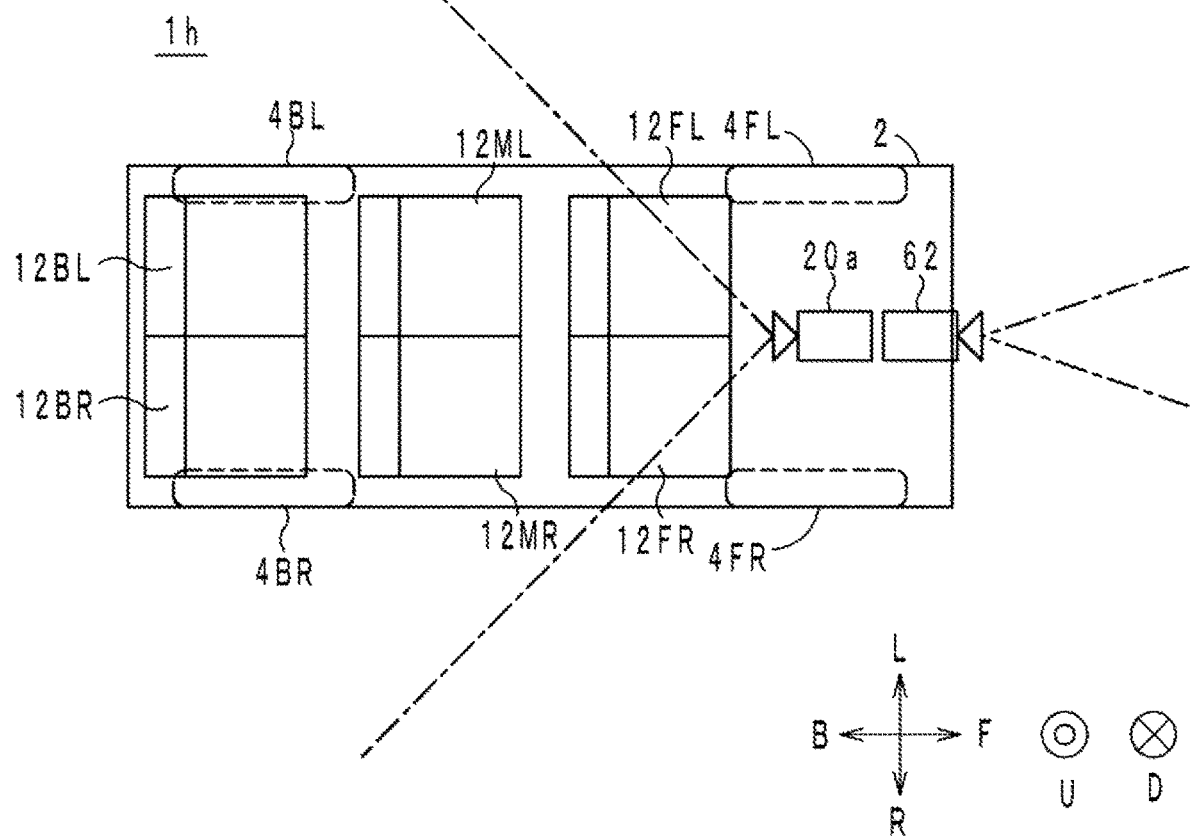
FIG. 19 is a diagram showing a seventh layout example.
Figure 20:
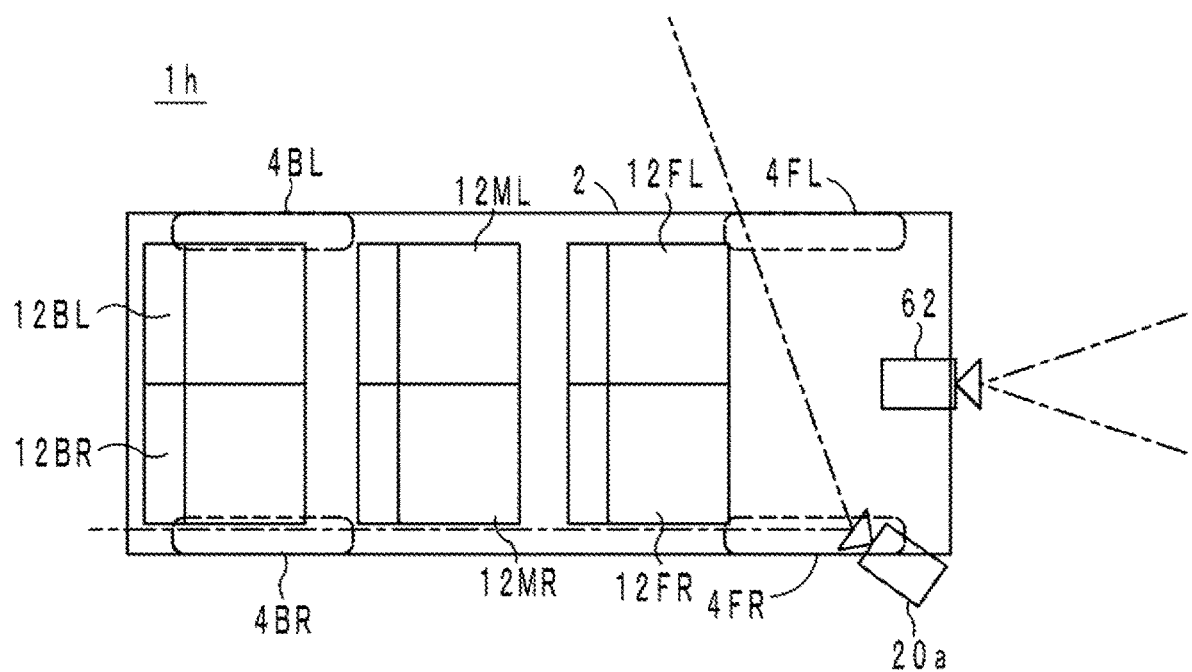
FIG. 20 is a diagram showing an eighth layout example.
Figure 22:
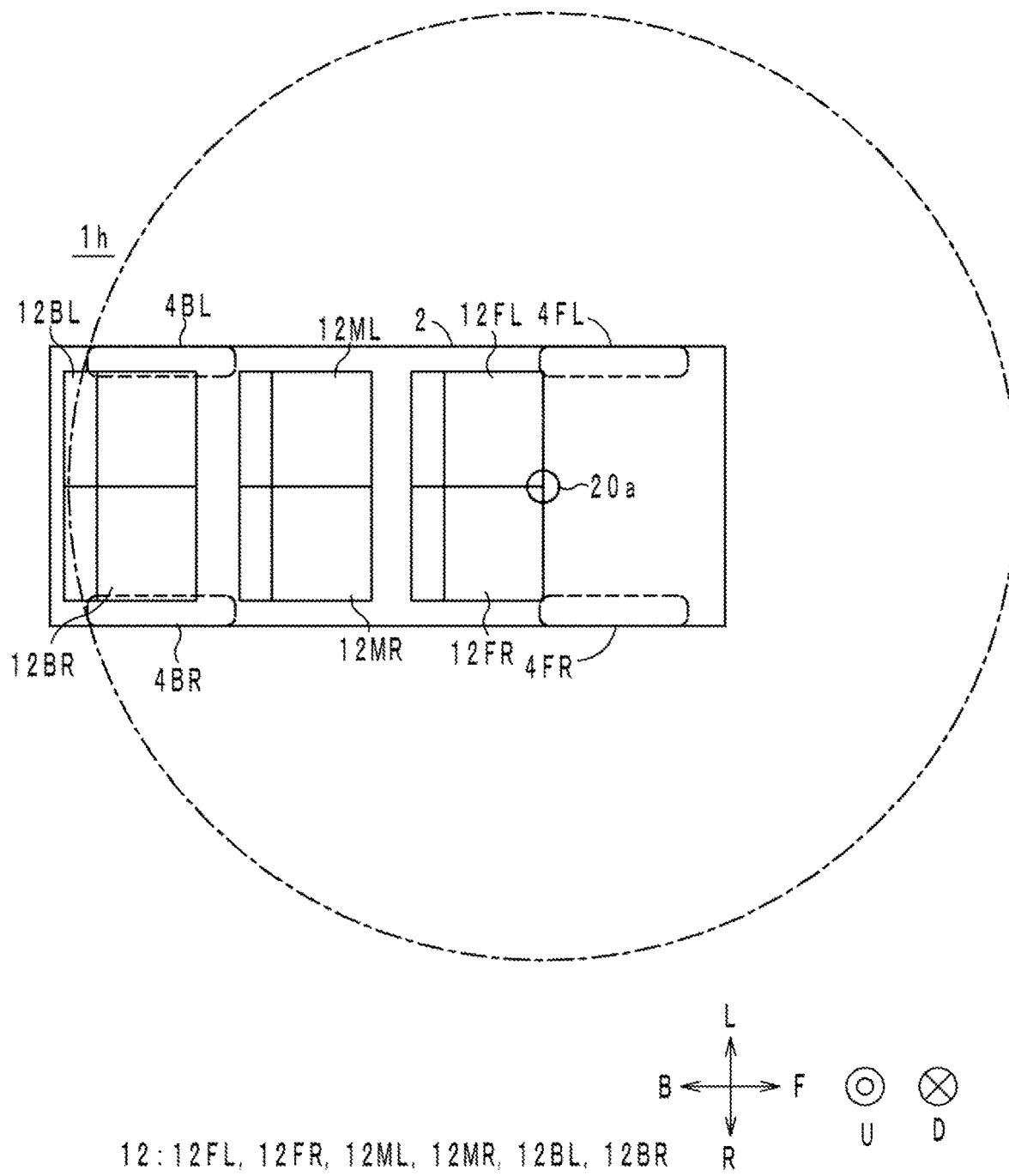
FIG. 22a is a diagram showing a tenth layout example.
FIG. 22b is a side view of an autonomous vehicle 1h.
FIG. 22c is a flowchart illustrating a starting process that the autonomous driving controller 14 carries out to start a vehicle.

Examples of the layout of the image-taking devices in the autonomous vehicle 1h will hereinafter be descried with reference to the drawings. FIG. 13 shows a first layout example. FIG. 14 shows a second layout example. FIG. shows a third layout example. FIG. 16 shows a fourth layout example. FIG. 17 shows a fifth layout example. FIG. 18 shows a sixth layout example. FIG. 19 shows a seventh layout example. FIG. 20 shows an eighth layout example. FIG. 21 shows a ninth layout example. FIG. 22A shows a tenth layout example.

In the first layout example, as shown in FIG. 13, the image-taking device 20a is positioned in the center of the vehicle body 2 with respect to the left-and-right direction LR and farther in the forward direction F than the left front seat 12FL and the right front seat 12FR. The image-taking device 20a faces in the backward direction B. The image-taking device 20b is positioned in the front end part and the left end part of the vehicle body 2. The image-taking device 20b faces in the backward direction B. The image-taking device 20c is positioned in the front end part and the right end part of the vehicle body 2. The image-taking device 20c faces in the backward direction B.

In the second layout example, as shown in FIG. 14, the image-taking device 20a is positioned in the center of the vehicle body 2 with respect to the left-and-right direction LR and farther in the backward direction B than the left rear seat 12BL and the right rear seat 12BR. The image-taking device 20a faces in the forward direction F. The image-taking device 20b is positioned in the front end part and the left end part of the vehicle body 2. The image-taking device 20b faces in the backward direction B. The image-taking device 20c is positioned in the front end part and the right end part of the vehicle body 2. The image-taking device 20c faces in the backward direction B.

Figure 15:
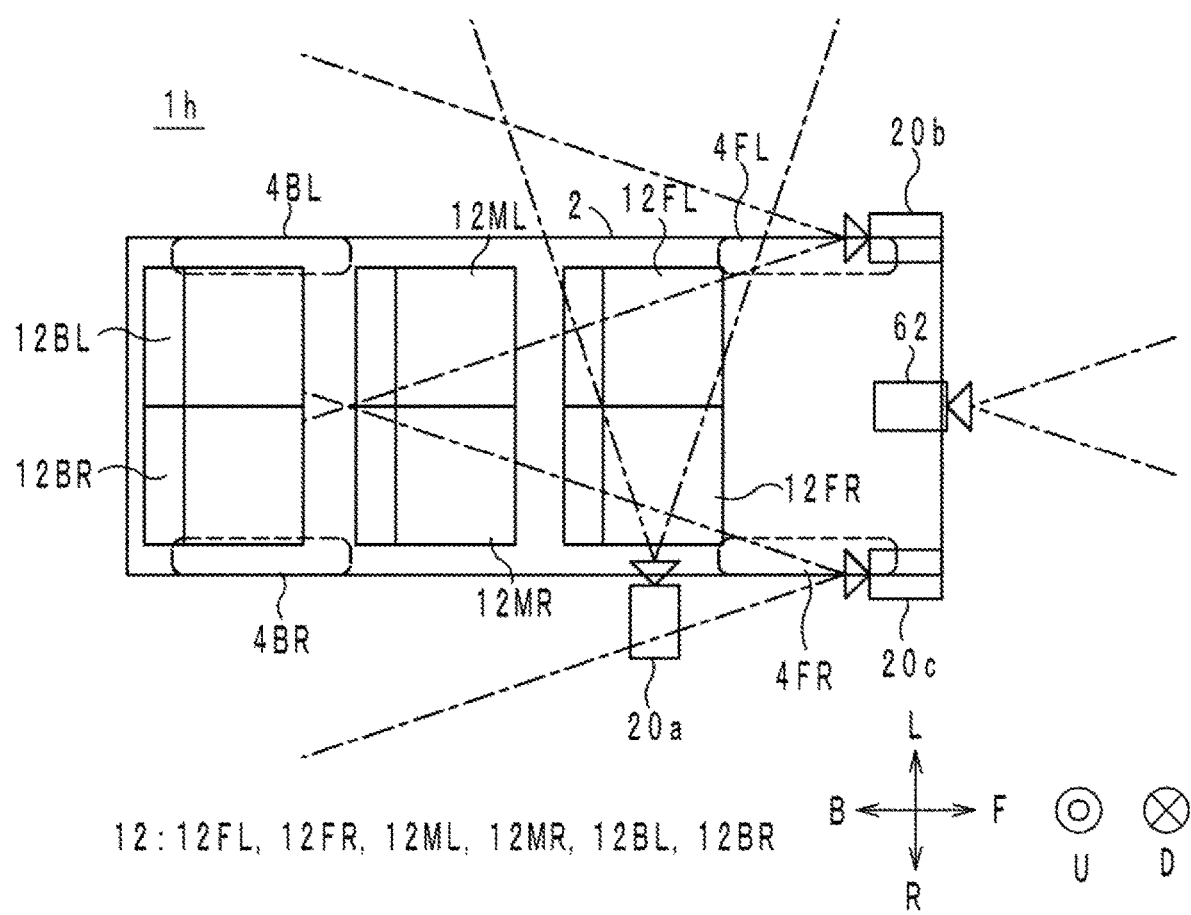
FIG. 15 is a diagram showing a third layout example.

In the third layout example, as shown in FIG. 15, the image-taking device 20a is positioned farther in the rightward direction R than the right front seat 12FR. The image-taking device 20a faces in the leftward direction L. The image-taking device 20b is positioned in the front end part and the left end part of the vehicle body 2. The image-taking device 20b faces in the backward direction B. The image-taking device 20c is positioned in the front end part and the right end part of the vehicle body 2. The image-taking device 20c faces in the backward direction B.

In the fourth layout example, as shown in FIG. 16, the image-taking device 20a is positioned in the front end part and the left end part of the vehicle body 2. The image-taking device 20a faces in the backward direction B. The image-taking device 20b is positioned in the rear end part and the right end part of the vehicle body 2. The image-taking device 20b faces in the forward direction F.

In the fifth layout example, as shown in FIG. 17, the image-taking device 20a is positioned in the front end part and the left end part of the vehicle 2. The image-taking device 20a faces in a right-backward direction RB. The image-taking device 20b is positioned in the front end part and the right end part of the vehicle body 2. The image-taking device 20b faces in a left-backward direction LB.

In the sixth layout example, as shown in FIG. 18, the image-taking device 20a is positioned in the front end part and the left end part of the vehicle 2. The image-taking device 20a faces in the backward direction B. The image-taking device 20b is positioned in the front end part and the right end part of the vehicle body 2. The image-taking device 20b faces in the backward direction B.

In the seventh layout example, as shown in FIG. 19, the image-taking device 20a is positioned in the center of the vehicle body 2 with respect to the right-and-left direction LR and farther in the forward direction F than the left front seat 12FL and the right front seat 12FR. The image-taking device 20a faces in the backward direction B. The shooting range of the image-taking device 20a positioned as shown in FIG. 19 is wider than the shooting range of the image-taking device 20a positioned as shown in FIG. 12.

In the eighth layout example, as shown in FIG. 20, the image-taking device 20a is positioned in the front end part and the right end part of the vehicle body 2. The image-taking device 20a faces in the left-backward direction LB. The shooting range of the image-taking device 20a positioned as shown in FIG. 20 is wider than the shooting range of the image-taking device 20a positioned as shown in FIG. 12.

In the ninth layout example, as shown in FIG. 21, the image-taking device 20a is positioned in the center of the vehicle body 2 with respect to the left-and-right direction LR and farther in the upward direction U than the left middle seat 12ML and the right middle seat 12MR. The image-taking device 20a faces in the downward direction D. The image-taking device 20a is configured to take images over a wide range in the downward direction D, the frontward direction F, the backward direction B, the leftward direction L and the rightward direction R. Therefore, the image-taking device 20a includes, for example, a fish-eye lens.

In the tenth layout example, as shown in FIG. 22A, the image-taking device 20a is positioned in the center of the vehicle 2 with respect to the right-and-left direction LR and farther in the upward direction U than the left front seat 12FL and the right front seat 12FR. The image-taking device 20a faces in the downward direction D. The image-taking device 20a is configured to take images over a wide range in the downward direction D, the frontward direction F, the backward direction B, the leftward direction L and the rightward direction R. Therefore, the image-taking device 20a includes, for example, a fish-eye lens. The image-taking device 20a shown in FIG. 22A also takes images of the area farther in the forward direction F than the autonomous vehicle 1h. Therefore, in the tenth layout example, the image-taking device 62 is not provided.

OTHER EMBODIMENTS

The embodiments and modifications described or illustrated herein are to make the present teaching easier to understand and not to limit the concept of the present teaching. It is possible to adapt or alter the embodiments and modifications described above without departing from the gist thereof.

The gist includes all equivalent elements, modifications, omissions, combinations (for example, combination of features of the embodiments and modifications), adaptations and alterations as would be appreciated by those in the art based on the embodiments and modifications disclosed herein. The limitations in the claims are to be interpreted broadly based on the language employed in the claims and not limited to embodiments described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

In each of the autonomous vehicles 1, 1b, 1d and 1e, the image-taking device 20 may take images of the plurality of seats 12 as well as images of the passengers in the autonomous vehicle 1, 1b, 1d, or 1e. In this case, the autonomous driving controller 14 may determine whether or not the passengers are seated in the plurality of seats 12, based on whether or not the seat surface of the plurality of seats 12 is recognizable. Specifically, when a seat surface of the plurality of seats 12 is found unrecognizable, the autonomous driving controller 14 determines that a passenger is seated on the seat surface of the plurality of seats 12. On the other hand, when a seat surface of the plurality of seats 12 is found recognizable, the autonomous driving controller 14 determines that nobody is seated on the seat surface of the plurality of seats 12. The autonomous driving controller 14 can count the number of seated passengers by counting the number of unrecognizable seat surfaces of the plurality of seats 12. In order to facilitate the autonomous driving controller 14 to recognize the seat surfaces, marks may be provided on the seat surfaces.

In each of the autonomous vehicles 1d and 1f, the image-taking device may take images of the plurality of seats 12 as well as the passengers in the autonomous vehicle 1d or 1f. In this case, at step S41 and S61, the autonomous driving controller 14 may figure out the number of seats by counting the number of seat surfaces of the plurality of seats 12 based on the non-contact detection data (image data). In order to facilitate the autonomous driving controller 14 to recognize the seat surfaces, marks may be provided on the seat surfaces.

Each of the autonomous vehicle 1 and 1a, as shown in FIG. 2, may include a weight sensor 28 and a step 50. The step 50 is a part of the vehicle body 2. The step 50 is a plate protruding in the rightward direction R from the floor of the vehicle body 2. Each passenger steps on the step 50 when getting in the autonomous vehicle 1 or 1a. The weight sensor 28 is provided in the step 50. The weight sensor 28 detects the weight of the passenger stepping on the step 50 and outputs contact detection data indicating the weight of the passenger. Thus, the weight sensor 28 is a contact-type detector which detects a passenger contacting an object (step 50) provided in the autonomous vehicle 1 or 1a and generates contact detection data. At step S1 or S11, the autonomous driving controller 14 figures out the number of passengers based on the contact detection data generated by the weight sensor 28. Then, the autonomous driving controller 14 can determine whether or not to control the driving/braking force generating device 7 to change the autonomous vehicle 1 or 1a from stopped state to run state, based on the contact detection data generated by the weight sensor 28.

As described above, in the autonomous vehicle 1 or 1a including the weight sensor 28, the weight sensor 28 detects a passenger contacting an object provided in the autonomous vehicle 1 or 1a. It is highly possible that the weight sensor 28 has a relatively simple structure. Accordingly, the structure of the autonomous vehicle 1 or 1a can be simplified.

The weight sensor 28 may be positioned on the floor of the vehicle body 2, near the entrance 60. In other words, the weight sensor 28 may be positioned inside the cabin space Sp.

Each of the autonomous vehicles 1 and 1a, as show in FIG. 2, may include an image-taking device 30. The image-taking device 30 takes images of an area around the entrance 60 of the autonomous vehicle 1 or 1a. Accordingly, the image-taking device 30 takes images of passengers getting in the autonomous vehicle 1 or 1a. The autonomous driving controller 14, at step S1 or S11, figures out the number of passengers based on the non-contact detection data (image data) generated by the image-taking device 30. Then, the autonomous driving controller 14 can determine whether or not to control the driving/braking force generating device 7 to change the autonomous vehicle 1 or 1a from stopped state to run state, based on the non-contact detection data generated by the image-taking device 30.

Each of the autonomous vehicle 1, 1b, 1d and 1e, as shown in FIG. 2, may include seat sensors 22FL, 22FR, 22BL and 22BR (seat sensors 22BL and 22BR not shown in the drawings). The seat sensors 22FL, 22FR, 22BL and 22BR are provided on the seat surfaces of the left front seat 12FL, the right front seat 12FR, the left rear seat 12BL and the right rear seat 12BR, respectively. The seat sensors 22FL, 22FR, 22BL and 22BR detect the weights of passengers seated in the left front seat 12FL, the right front seat 12FR, the left rear seat 12BL and the right rear seat 12BR, respectively, and output contact detection data indicating the weights of the passengers. Thus, each of the seat sensors 22FL, 22FR, 22BL and 22BR is a contact-type detector which detects a passenger contacting an object (the seat surface of the left front seat 12FL, the right front seat 12FR, the left rear seat 12BL or the right rear seat 12BR) provided in the autonomous vehicle 1, 1b, 1d or 1e and generates contact detection data. The autonomous driving controller 14, at step S2, S22, S42 or S52, figures out the number of seated passengers based on the contact detection data generated by the seat sensors 22FL, 22FR, 22BL and 22BR. Then, the autonomous driving controller 14 can determine whether or not to control the driving/braking force generating device 7 to change the autonomous vehicle 1, 1b, 1d or 1e from stopped state to run state, based on the contact detection data generated by the seat sensors 22FL, 22FR, 22BL and 22BR.

As described above, in the autonomous vehicle 1, 1b, 1d or 1e including the seat sensors 22FL, 22FR, 22BL and 22BR, each of the seat sensors 22FL, 22FR, 22BL and 22BR detects a passenger contacting an object provided in the autonomous vehicle 1, 1b, 1d or 1e. It is highly possible that the seat sensors 22FL, 22FR, 22BL and 22BR have a relatively simple structure. Accordingly, the structure of the autonomous vehicle 1, 1b, 1d or 1e can be simplified. The seat sensors 22FL, 22FR, 22BL and 22BR may be provided on the backrests of the left front seat 12FL, the right front seat 12FR, the left rear seat 12BL and the right rear seat 12BR, respectively.

Each of the autonomous vehicles 1a, 1c, 1f and 1g, as shown in FIG. 2, may have buttons 26FL, 26FR, 26BL and 26BR (the buttons 26BL and 26BR not shown in the drawings). The buttons 26FL, 26FR, 26BL and 26BR are ready-state buttons provided for the left front seat 12FL, the right front seat 12FR, the left rear seat 12BL and the right rear seat 12BR, respectively. The buttons 26FL, 26FR, 26BL and 26BR are positioned farther in the leftward direction L or the rightward direction R than the respective passengers seated in the left front seat 12FL, the right front seat 12FR, the left rear seat 12BL and the right rear seat 12BR. The passengers individually press the buttons 26FL, 26FR, 26BL and 26BR to indicate that they are ready for a change of the autonomous vehicle 1a, 1c, 1f or 1g from stopped state to run state. When the buttons 26FL, 26FR, 26BL and 26BR are pressed by the passengers, the buttons each output contact detection data indicating that the passenger expresses his/her consent to a change of the autonomous vehicle 1a, 1c, 1f or 1g from stopped state to run state. Thus, each of the buttons 26FL, 26FR, 26BL and 26BR is a contact-type detector which detects a passenger contacting an object (buttons 26FL, 26FR, 26BL and 26BR) provided in the autonomous vehicle 1a, 1c, 1f or 1g and generates contact detection data.

The autonomous driving controller 14, at step S12, S32, S62 or S72, figures out the number of ready-state expressing passengers based on the contact detection data generated by the buttons 26FL, 26 FR, 26BL and 26BR. Then, the autonomous driving controller 14 can determine whether or not to control the driving/braking force generating device 7 to change the autonomous vehicle 1a, 1c, if or 1g from stopped state to run state, based on the contact detection data generated by the buttons 26FL, 26FR, 26BL and 26BR.

As described above, in the autonomous vehicle 1a, 1c, if or 1g including the buttons 26FL, 26FR, 26BL and 26BR, each of the buttons 26FL, 26FR, 26BL and 26BR detects a passenger contacting an object provided in the autonomous vehicle 1a, 1c, if or 1g. It is highly possible that the buttons 26FL, 26FR, 26BL and 26BR have a relatively simple structure. Accordingly, the structure of the autonomous vehicle 1a, 1c, if or 1g is simple.

The buttons 26FL, 26FR, 26BL and 26BR are completely different from the start button taught in Non-Patent Literature 1. According to Non-Patent Literature 1, when a passenger presses the start button, the autonomous vehicle is started, regardless of the other passengers' intentions. On the other hand, with the buttons 26FL, 26FR, 26BL and 26BR, the passengers individually express their consents to a change of the autonomous vehicle 1a, 1c, if or 1g from stopped state to run state by pressing the buttons 26FL, 26FR, 26BL and 26BR. Thus, the buttons 26FL, 26FR, 26BL and 26BR are different from the start button in that the buttons 26FL, 26FR, 26BL and 26BR are to indicate the passengers' individual intentions, while the start button is to indicate one passenger's intention.

The autonomous vehicle 1 may include an image-taking device 20, which is a non-contact-type detector, and a weight sensor 28, which is a contact-type detector. The autonomous driving controller 14 figures out the number of seated passengers based on non-contact detection data generated by the image-taking device 20. The autonomous driving controller 14 figures out the number of passengers based on contact detection data generated by the weight sensor 28. Then, the autonomous driving controller 14 determines whether or not to control the driving/braking force generating device 7 to change the autonomous vehicle 1 from stopped state to run state, based on the non-contact detection data generated by the image-taking device 20 and the contact detection data generated by the weight sensor 28.

The autonomous vehicle 1 may include an image-taking device 20, which is a non-contact-type detector, and seat sensors 22FL, 22FR, 22BL and 22BR, which are contact-type detectors. The autonomous driving controller 14 figures out the number of passengers based on non-contact detection data generated by the image-taking device 20. The autonomous driving controller 14 figures out the number of seated passengers based on contact detection data generated by the seat sensors 22FL, 22FR, 22BL and 22BR. Then, the autonomous driving controller 14 determines whether or not to control the driving/braking force generating device 7 to change the autonomous vehicle 1 from stopped state to run state, based on the non-contact detection data generated by the image-taking device 20 and the contact detection data generated by the seat sensors 22FL, 22FR, 22BL and 22BR.

When the autonomous vehicle 1 includes a non-contact-type detector and a contact-type detector as in the cases described above, the autonomous driving controller 14 can obtain more kinds of information from non-contact detection data and contact detection data. More specifically, the information obtained from contact detection data is not always completely consistent with the information obtained from non-contact detection data. There are some kinds of information that the autonomous driving controller 14 can obtain from contact detection data but cannot obtain from non-contact detection data. Also, there are some kinds of information that the autonomous driving controller 14 can obtain from non-contact detection data but cannot obtain from contact detection data. Therefore, the autonomous driving controller 14 takes in both non-contact detection data and contact detection data. Thereby, the autonomous driving controller 14 can obtain more kinds of information from the contact detection data and the non-contact detection data.

The autonomous vehicle 1 may include seat sensors 22FL, 22FR, 22BL and 22BR, and a weight sensor 28, which are contact-type detectors. The autonomous driving controller 14 figures out the number of passengers based on contact data generated by the weight sensor 28. The autonomous driving controller 14 figures out the number of seated passengers based on contact data generated by the seat sensors 22FL, 22FR, 22BL and 22BR. Then, the autonomous driving controller 14 determines whether or not to control the driving/braking force generating device 7 to change the autonomous vehicle 1 from stopped state to run state, based on the contact data generated by the seat sensors 22FL, 22FR, 22BL and 22BR, and the weight sensor 28.

The autonomous vehicle 1a may include an image-taking device 20, which is a non-contact-type detector, and buttons 26FL, 26FR, 26BL and 26BR, which are contact-type detectors. The autonomous driving controller 14 figures out the number of passengers based on non-contact data generated by the image-taking device 20. The autonomous driving controller 14 figures out the number of ready-state expressing passengers based on contact detection data generated by the buttons 26FL, 26FR, 26BL and 26BR. Then, the autonomous driving controller 14 determines whether or not to control the driving/braking force generating device 7 to change the autonomous vehicle 1a from stopped state to run state, based on the non-contact data generated by the image-taking device 20 and the contact data generated by the buttons 26FL, 26FR, 26BL and 26BR.

The autonomous vehicle 1a may include an image-taking device 20, which is a non-contact-type detector, and a weight sensor 28, which is a contact-type detector. The autonomous driving controller 14 figures out the number of ready-state expressing passengers based on non-contact detection data generated by the image-taking device 20. The autonomous driving controller 14 figures out the number of passengers based on contact detection data generated by the weight sensor 28. Then, the autonomous driving controller 14 determines whether or not to control the driving/braking force generating device 7 to change the autonomous vehicle 1a from stopped state to run state, based on the non-contact data generated by the image-taking device and the contact detection data generated by the weight sensor 28.

When the autonomous vehicle 1a includes a non-contact-type detector and a contact-type detector as in the cases described above, the autonomous driving controller 14 can obtain more kinds of information from non-contact detection data and contact detection data. More specifically, the information obtained from contact detection data is not always completely consistent with the information obtained from non-contact detection data. There are some kinds of information that the autonomous driving controller 14 can obtain from contact detection data but cannot obtain from non-contact detection data. Also, there are some kinds of information that the autonomous driving controller 14 can obtain from non-contact detection data but cannot obtain from contact detection data. Therefore, the autonomous driving controller 14 takes in both non-contact detection data and contact detection data. Thereby, the autonomous driving controller 14 can obtain more kinds of information from the contact detection data and the non-contact detection data.

The autonomous vehicle 1a may include buttons 26FL, 26FR, 26BL and 26BR, and a weight sensor 28, which are contact-type detectors. The autonomous driving controller 14 figures out the number of passengers based on the contact detection data generated by the weight sensor 28. The autonomous driving controller 14 figures out the number of ready-state expressing passengers based on the contact detection data generated by the buttons 26FL, 26FR, 26BL and 26BR. Then, the autonomous driving controller 14 determines whether or not to control the driving/braking force generating device 7 to change the autonomous vehicle 1a from stopped state to run state, based on the contact detection data generated by the buttons 26FL, 26FR, 26BL and 26BR and the weight sensor 28.

In each of the autonomous vehicles 1, 1a, 1b, 1c, 1d, 1e, lf, 1g and 1h, the autonomous driving controller 14 determines whether or not to control the driving/braking force generating device 7 to change the autonomous vehicle 1, la, 1b, 1c, 1d, 1e, lf, 1g or 1h from stopped state to run state, based on (1) at least one of the number of passengers, the maximum capacity, the number of seats or the scheduled number of passengers, and (2) at least one of the number of seated passengers or the number of ready-state expressing passengers.

The autonomous driving controller 14 relies on (1) at least one of the number of passengers, the maximum capacity, the number of seats or the scheduled number of passengers, and (2) at least one of the number of seated passengers or the number of ready-state expressing passengers in determining whether or not to control the driving/braking force generating device 7 to change the autonomous vehicle 1, 1a, 1b, 1c, 1d, 1e, lf, 1g or 1h from stopped state to run state. Accordingly, the autonomous driving controller 14 may determine whether or not to control the driving/braking force generating device 7 to change the autonomous vehicle 1, 1a, 1b, 1c, 1d, 1e, lf, 1g or 1h from stopped state to run state, based on any combination of (1) more than one of the number of passengers, the maximum capacity, the number of seats or the scheduled number of passengers, and (2) more than one of the number of seated passengers or the number of ready-state expressing passengers.

As thus far described, the autonomous driving controller 14 determines whether or not to control the driving/braking force generating device 7 to change the autonomous vehicle 1, 1a, 1b, 1c, 1d, 1e, lf, 1g or 1h from stopped state to run state, based on (1) at least one of the number of passengers, the maximum capacity, the number of seats or the scheduled number of passengers, and (2) at least one of the number of seated passengers or the number of ready-state expressing passengers. With this technical idea, it is possible to alter the conditions required for a start of the autonomous vehicle 1, 1a, 1b, 1c, 1d, 1e, lf, 1g or 1h in accordance with the route of the autonomous vehicle 1, 1a, 1b, 1c, 1d, 1e, lf, 1g or 1h, a specific scene, or the autonomous vehicle 1, 1a, 1b, 1c, 1d, 1e, lf, 1g or 1h to be driven. Accordingly, the flexibility of design of the autonomous vehicle 1, 1a, 1b, 1c, 1d, 1e, lf, 1g or 1h including a plurality of seats 12 is improved.

In each of the autonomous vehicles 1, 1a, 1b, 1c, 1d, 1e, lf, 1g and 1h, the autonomous driving controller 14 may determine whether or not to control the driving/braking force generating device 7 to change the autonomous vehicle 1, 1a, 1b, 1c, 1d, 1e, lf, 1g or 1h from stopped state to run state, based on any other conditions than the number of passengers, the maximum capacity, the number of seats, the scheduled number of passengers, the number of seated passengers and the number of ready-state expressing passengers. Other conditions than the number of passengers, the maximum capacity, the number of seats, the scheduled number of passengers, the number of seated passengers and the number of ready-state expressing passengers are, for example, the environment around the autonomous vehicle 1, 1a, 1b, 1c, 1d, 1e, 1f, 1g or 1h (presence or non-presence of obstacles), the time period for which no obstacles have been around the autonomous vehicle 1, 1a, 1b, 1c, 1d, 1e, 1f, 1g or 1h, the scheduled time of departure, and the like.

Each of the autonomous vehicles 1, 1a, 1b, 1c, 1d, 1e, 1f, 1g and 1h may further include a start button as taught in Non-Patent Literature 1. In this case, the autonomous driving controller 14 determines whether or not to control the driving/braking force generating device 7 to change the autonomous vehicle 1, 1a, 1b, 1c, 1d, 1e, 1f, 1g or 1h from stopped state to run state, based on (1) at least one of the number of passengers, the maximum capacity, the number of seats or the scheduled number of passengers, (2) at least one of the number of seated passengers or the number of ready-state expressing passengers, and whether or not the start button as taught in Non-Patent Literature 1 has been pressed.

In each of the autonomous vehicles 1 and 1a, the autonomous driving controller 14 may obtain data about the number of passengers from, for example, a line sensor or an infrared laser provided around the entrance 60. Alternatively, the autonomous driving controller 14 may obtain data about the number of passengers from a Bluetooth (registered trade name) low-energy beacon. In other words, the autonomous driving controller 14 may count the number of mobile wireless terminals, such as smartphones and the like, in the autonomous vehicle 1 or 1a by using a Bluetooth (registered trade name) low-energy beacon. In this case, the autonomous driving controller 14 considers the number of mobile wireless terminals, such as smartphones and the like, in the autonomous vehicle 1 or 1a as the number of passengers.

In each of the autonomous vehicles 1 and 1a, the autonomous driving controller 14 may figure out the number of passengers, for example, based on voice. More specifically, the autonomous driving controller 14 collects voice inside the autonomous vehicle 1 or 1a by using a microphone (not shown). Then, the autonomous driving controller 14 figures out the number of passengers based on the collected voice.

In each of the autonomous vehicles 1, 1b, 1d and 1e, the autonomous driving controller 14 may obtain data about the number of seated passengers, for example, by any of the following structures.

Distance Between Ceiling and Seat Surface (or Passenger)

When one or more passengers sit down in the plurality of seats 12, the one or more passengers appear on a seat surface of the plurality of seats 12. Accordingly, the distance between the ceiling of the vehicle body 2 and the one or more passengers seated in the plurality of seats 12 is shorter than the distance between the ceiling of the vehicle body 2 and the seat surface of the plurality of seats 12. Therefore, the autonomous driving controller 14 measures the ceiling of the vehicle body 2 and the seat surface of the plurality of seats 12 or the distance between the ceiling of the vehicle body 2 and the one or more passengers seated in the plurality of seats 12 by using a distance measuring device (not shown). Then, when the distance measured by the distance measuring device is relatively short, the autonomous driving controller 14 determines that the one or more passengers is seated in the plurality of seats 12. When the distance measured by the distance measuring device is relatively long, the autonomous driving controller 14 determines that the passenger is not seated in the plurality of seats 12.

Positional Relationship Between Ceiling and Passenger's Face

When a passenger sits down in the plurality of seats 12, the distance between the ceiling of the vehicle body 2 and the passenger's face becomes larger than that when the passenger does not sit on the plurality of seats 12. Therefore, the autonomous driving controller 14 figures out the distance between the ceiling of the vehicle body 2 and the passenger's face based on an image taken by the image-taking device 20. When the distance between the ceiling of the vehicle body 2 and the passenger's face is relatively short, the autonomous driving controller 14 determines that the passenger is not seated in the plurality of seats 12. When the distance between the ceiling of the vehicle body 2 and the passenger's face is relatively long, the autonomous driving controller 14 determines that the passenger is seated in the plurality of seats 12.

Output from Gyroscope Sensor of Wireless Communication Terminal

The autonomous driving controller 14 obtains an output from the gyroscope sensor of a passenger's wireless communication terminal via a communication device (not shown). When the fluctuation of output from the gyroscope sensor is relatively small, the autonomous driving controller 14 determines that the passenger is seated in the plurality of seats 12. When the fluctuation of output from the gyroscope sensor is relatively large, the autonomous driving controller 14 determines that the passenger is not seated in the plurality of seats 12.

Output from Barometer of Wireless Communication Terminal

The autonomous driving controller 14 obtains an output from the barometer of a passenger's wireless communication terminal via a communication device (not shown). When the output from the barometer indicates a relatively high air pressure, the autonomous driving controller 14 determines that the passenger is seated in the plurality of seats 12. When the output from the barometer indicates a relatively low air pressure, the autonomous driving controller 14 determines that the passenger is not seated in the plurality of seats 12.

In each of the autonomous vehicles 1, 1a, 1b, 1c, 1d, 1e, 1f, 1g and 1h, the autonomous driving controller 14 is set in the vehicle body 2. However, the autonomous driving controller 14 does not need to be set in the vehicle body 2, and the autonomous driving controller 14 may be placed away from the vehicle body 2. In this case, the autonomous driving controller 14 placed away from the vehicle body 2 carries out a process along the flowchart shown in any of FIGS. 3 to 10. Then, the autonomous driving controller 14 controls the driving/braking force generating device 7 via wireless communication. In this case, the autonomous driving controller 14 may autonomously drive a plurality of autonomous vehicles 1, 1a, 1b, 1c, 1d, 1e, 1f, 1g or 1h at the same time.

Some functional part of the autonomous driving controller 14 may be placed in the vehicle body 2, and the other functional part of the autonomous driving controller 14 may be placed away from the vehicle body 2. In this case, some part of the flowchart shown in any of FIGS. 3 to 10 is carried out by the part of the autonomous driving controller 14 placed in the vehicle body 2. The other part of the flowchart shown in any of FIGS. 3 to 10 is carried out by the other part of the autonomous driving controller 14 placed away from the vehicle body 2.

In each of the autonomous vehicle 1 and 1a, the autonomous driving controller 14 may figure out the number of passengers by using any other measures than "OpenPose". For example, the autonomous driving controller 14 recognizes passengers' faces based on the image data generated by the image-taking device 20. The autonomous driving controller 14 can figure out the number of passengers by counting the number of recognized passengers' faces.

Each of the autonomous vehicles 1, 1a, 1b, 1c, 1d, 1e, 1f, 1g and 1h, as shown in FIG. 1, may further include a speaker 24. The autonomous driving controller 14 makes an announcement through the speaker 24 to invite the passengers to sit down. A display may be used instead of the speaker 24. In this case, a video to invite the passengers to sit down is displayed on the display. The speaker 24 and the display are examples of an information delivering device that delivers information to invite the passengers to sit down. This permits a prompt start of the autonomous vehicle 1, 1a, 1b, 1c, 1d, 1e, 1f, 1g or 1h. In each of the autonomous vehicles 1a, 1f and 1g, the autonomous driving controller 14 may also make an announcement through the speaker 24 or the display to request the passengers to make the ready sign.

Each of the autonomous vehicles 1, 1a, 1b, 1c, 1d, 1e, 1f, 1g and 1h includes four wheels 4. However, the number of wheels 4 may be three or less, or may be five or more.

The braking force generator 10 has been described as a device that converts the kinetic energy of the wheels 4 into thermal energy. However, in a case where the driving force generator 8 includes a motor, the braking force generator 10 may be a device that converts the kinetic energy of the wheels 4 into electric energy. In short, the braking force generator 10 may be a regenerative brake.

Each of the autonomous vehicles 1, 1a, 1b, 1c, 1d, 1e, 1f, 1g and 1h may be configured such that a person in a wheeled chair can get therein. In this case, the plurality of seats 12 is flip-up seats. The flip-up seat turns such that the seat surface comes into contact with the backrest when nobody sits in the seat. Thereby, a space for a passenger in a wheeled chair is made in the cabin space Sp.

The non-contact-type detector may be, for example, an infrared thermography camera. Further, the non-contact-type detector does not need to be an image-taking device.

The plurality of seats 12 may include seat belts.

In each of the autonomous vehicles 1 and 1a, the autonomous driving controller 14 may determine whether or not to control the driving/braking force generating device 7 to change the autonomous vehicle 1 or 1a to change from stopped state to run state, based on (1) the number of passengers and (2) at least one of the number of seated passengers or the number of ready-state expressing passengers, all of which are figured out from the non-contact data generated by the non-contact-type detector. In each of the autonomous vehicles 1 and 1a, alternatively, the autonomous driving controller 14 may determine whether or not to control the driving/braking force generating device 7 to change the autonomous vehicle 1 or 1a to change from stopped state to run state, based on (1) the number of passengers and (2) at least one of the number of seated passengers or the number of ready-state expressing passengers, all of which are figured out from contact detection data generated by a contact-type detector.

Figure 22C:
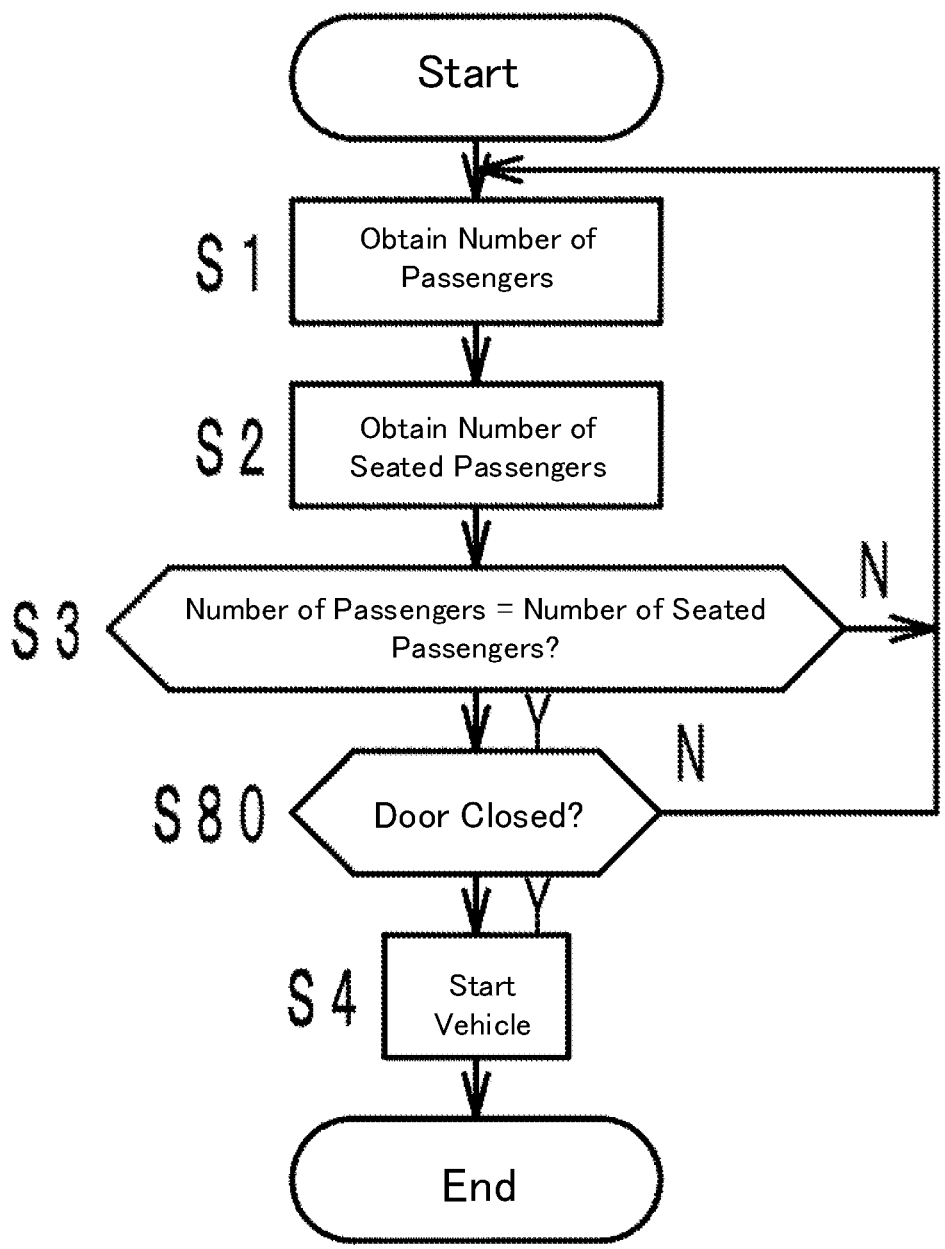

FIG. 22B is a side view of an autonomous vehicle 1h. FIG. 22C is a flowchart showing a starting process the autonomous driving controller 14 carried out.

As shown in FIG. 22B, in each of the autonomous vehicles 1, 1a, 1b, 1c, 1d, 1e, 1f and 1g, the vehicle body 2 may include a door 100. In this case, the autonomous driving controller 14 determines whether or not to control the driving/braking force generating device 7 to change the autonomous vehicle 1, 1a, 1b, 1c, 1d, 1e, 1f or 1g to change from stopped state to run state, based on (1) at least one of the number of passengers, the maximum capacity, the number of seats or the scheduled number of passengers, (2) at least one of the number of seated passengers or the number of ready-state expressing passengers, and whether the door is open or closed. With reference to FIG. 22C, exemplary operations of the autonomous vehicle 1h will be described below.

Steps S1 to S3 in FIG. 22C are the same as steps S1 to S3 in FIG. 3, and the description thereof is omitted. When the number of passengers and the number of seated passengers are equal at step S3, the autonomous driving controller 14 determines whether or not the door 100 is closed (step S80). When the door 100 is not closed, the process returns to step S1. When the door 100 is closed, the process goes to step S4. Step S4 in FIG. 22C is the same as step S3 in FIG. 3, and the description thereof is omitted.

REFERENCE SIGNS LIST 1, 1a to 1i vehicle
2 vehicle body
4 wheel
4BL left rear wheel
4BR right rear wheel
4FL left front wheel
4FR right front wheel
6 steering mechanism
7 driving/braking force generating device
8 driving force generator
10 braking force generator
12 seat
12BL left rear seat
12BR right rear seat
12FL left front seat
12FR right front seat
12ML left middle seat
12MR right middle seat
14 autonomous driving controller
16 storage device
20 image—taking device
20a to 20c image—taking device
22BL, 22BR, 22FL, 22FR seat sensor
24 speaker
26BL, 26BR, 26FL, 26FR button
28 weight sensor
30 image—taking device
60 entrance
62 image—taking device
100 door
Sp cabin space

The invention claimed is:

1. An autonomous vehicle comprising:
a vehicle body having a cabin space formed therein, the cabin space being so formed as to inhibit each passenger of the autonomous vehicle from standing upright;
a wheel supported by the vehicle body;
a steering mechanism supported by the vehicle body, and configured to change a direction of travel of the autonomous vehicle;
a driving/braking force generating device supported by the vehicle body, and configured to generate a driving force to drive the autonomous vehicle and a braking force to decelerate the autonomous vehicle;
a plurality of seats supported by the vehicle body, and each configured to be sat on by a passenger; and
an autonomous driving controller including
a processor, and
a non-transitory storage medium containing program instructions,
execution of the program instructions by the processor causing the autonomous driving controller to control the steering mechanism and the driving/braking force generating device to autonomously drive the autonomous vehicle without any driver's manipulation, wherein
the execution of the program instructions by the processor causes the autonomous driving controller to control the driving/braking force generating device to change the autonomous vehicle from a stopped state to a run state, based on
(1) a number of passengers, and a number of ready-state-expressing passengers,
(2) a maximum capacity, and the number of ready-state-expressing passengers, and
(3) a scheduled number of passengers, and the number of ready-state-expressing passengers, wherein
said number of passengers is a total number of passengers in the autonomous vehicle,
said maximum capacity is a total number of the seats in the autonomous vehicle,
said scheduled number of passengers is a total number of passengers who are scheduled to be in the autonomous vehicle, and
said number of ready-state-expressing passengers is a total number of passengers who are each both
seated on one of the plurality of seats, and
making a sign of being ready for a change of the autonomous vehicle from the stopped state to the run state.

2. The autonomous vehicle according to claim 1, further comprising:
a non-contact-type detector configured to detect conditions inside the autonomous vehicle in a non-contacting manner and to thereby generate non-contact detection data, wherein
the execution of the program instructions by the processor causes the autonomous driving controller to control the driving/braking force generating device to change the autonomous vehicle from the stopped state to the run state, based on the non-contact detection data generated by the non-contact-type detector.

3. The autonomous vehicle according to claim 2, wherein the non-contact-type detector is an image-capturing device configured to capture an image of an inside of the autonomous vehicle, to thereby generate image data; and
the execution of the program instructions by the processor causes the autonomous driving controller to control the driving/braking force generating device to change the autonomous vehicle from the stopped state to the run state, based on the image data generated by the image-capturing device.

4. The autonomous vehicle according to claim 3, wherein the image of the inside of the autonomous vehicle is at least one of an image of an entrance area of the autonomous vehicle or an image of a passenger in the autonomous vehicle.

5. The autonomous vehicle according to claim 2, wherein the number of ready-state-expressing passengers is recognized from the non-contact detection data generated by the non-contact-type detector.

6. The autonomous vehicle according to claim 1, further comprising:
   a contact-type detector configured to detect a passenger contacting an object provided in the autonomous vehicle and to thereby generate contact detection data, wherein
   the execution of the program instructions by the processor causes the autonomous driving controller to control the driving/braking force generating device to change the autonomous vehicle from the stopped state to the run state, based on the contact detection data generated by the contact-type detector.

7. The autonomous vehicle according to claim 6, wherein the number of ready-state-expressing passengers is recognized from the contact detection data generated by the contact-type detector.

8. The autonomous vehicle according to claim 6, wherein:
   the contact-type detector includes a plurality of buttons respectively provided for the plurality of seats; and
   the execution of the program instructions by the processor causes the autonomous driving controller to recognize the number of ready-state-expressing passengers based on the contact detection data generated by the contact-type detector.

9. The autonomous vehicle according to claim 1, further comprising:
   a contact-type detector configured to detect a passenger contacting an object provided in the autonomous vehicle and to thereby generate contact detection data; and
   a non-contact-type detector configured to detect conditions inside the autonomous vehicle and to thereby generate non-contact detection data, wherein
   the execution of the program instructions by the processor causes the autonomous driving controller to control the driving/braking force generating device to change the autonomous vehicle from the stopped state to the run state, based on the contact detection data generated by the contact-type detector and the non-contact detection data generated by the non-contact-type detector.

10. The autonomous vehicle according to claim 1, wherein the plurality of seats are so formed as to allow two passengers of the autonomous vehicle, when seated therein, to have face-to-face conversation with each other.

11. The autonomous vehicle according to claim 1, further comprising an information-providing device configured to provide information to invite a passenger of the autonomous vehicle to sit down on one of the plurality of seats.

12. The autonomous vehicle according to claim 1, further comprising a door, wherein
   the execution of the program instructions by the processor causes the autonomous driving controller to control the driving/braking force generating device to change the autonomous vehicle from the stopped state to the run state, further based on
   whether the door is open or closed.

13. An autonomous vehicle comprising:
   a vehicle body;
   a wheel supported by the vehicle body;
   a steering mechanism supported by the vehicle body, and configured to change a direction of travel of the autonomous vehicle;
   a driving/braking force generating device supported by the vehicle body, and configured to generate a driving force to drive the autonomous vehicle and a braking force to decelerate the autonomous vehicle;
   a plurality of seats supported by the vehicle body, and each configured to be sat on by a passenger; and
   an autonomous driving controller including
      a processor, and
      a non-transitory storage medium containing program instructions,
   execution of the program instructions by the processor causing the autonomous driving controller to control the steering mechanism and the driving/braking force generating device to autonomously drive the autonomous vehicle without any driver's manipulation, wherein
      the autonomous driving controller is configured to determine whether or not to control the driving/braking force generating device to change the autonomous vehicle from a stopped state to a run state, based on a number of passengers and a number of sitting passengers, and on whether the number of passengers and the number of sitting passengers are equal or not, wherein
      said number of passengers is a total number of passengers in the autonomous vehicle, and
      said number of sitting passengers is a total number of passengers who are each seated in one of the plurality of seats of the autonomous vehicle.

14. The autonomous vehicle according to claim 13, further comprising:
   a non-contact-type detector configured to detect conditions inside the autonomous vehicle in a non-contacting manner and to thereby generate non-contact detection data, wherein
   the execution of the program instructions by the processor causes the autonomous driving controller to control the driving/braking force generating device to change the autonomous vehicle from the stopped state to the run state, based on the non-contact detection data generated by the non-contact-type detector.

15. The autonomous vehicle according to claim 14, wherein the number of sitting passengers is recognized from the non-contact detection data generated by the non-contact-type detector.

16. The autonomous vehicle according to claim 13, further comprising:
   a contact-type detector configured to detect a passenger contacting an object provided in the autonomous vehicle and to thereby generate contact detection data, wherein
   the execution of the program instructions by the processor causes the autonomous driving controller to control the driving/braking force generating device to change the autonomous vehicle from the stopped state to the run state, based on the contact detection data generated by the contact-type detector.

17. The autonomous vehicle according to claim 16, wherein the number of sitting passengers is recognized from the contact detection data generated by the contact-type detector.

18. The autonomous vehicle according to claim 13, further comprising a door, wherein the execution of the program instructions by the processor causes the autonomous driving controller to control the driving/braking force generating device to change the autonomous vehicle from the stopped state to the run state, further based on whether the door is open or closed.

19. The autonomous vehicle according to claim 13, further comprising:

a contact-type detector configured to detect a passenger contacting an object provided in the autonomous vehicle and to thereby generate contact detection data; and a non-contact-type detector configured to detect conditions inside the autonomous vehicle and to thereby generate non-contact detection data, wherein the execution of the program instructions by the processor causes the autonomous driving controller to control the driving/braking force generating device to change the autonomous vehicle from the stopped state to the run state, based on the contact detection data generated by the contact-type detector and the non-contact detection data generated by the non-contact-type detector.

* * * * *

UNITED STATES PATENT AND TRADEMARK OFFICE
CERTIFICATE OF CORRECTION

PATENT NO. : 11,897,513 B2
APPLICATION NO. : 17/239162
DATED : February 13, 2024
INVENTOR(S) : Yoshiki Kuranuki and Hokuto Fujii It is certified that error appears in the above-identified patent and that said Letters Patent is hereby corrected as shown below:

On the Title Page

Item (30) Foreign Application Data should read:
Dec. 7, 2018    (JP) ............... 2018230439
Oct. 24, 2018   (JP) ............... PCT/JP2018/039559

Signed and Sealed this
Seventeenth Day of September, 2024

Katherine Kelly Vidal
*Director of the United States Patent and Trademark Office*